United States Patent
Liu et al.

(10) Patent No.: US 11,665,583 B2
(45) Date of Patent: May 30, 2023

(54) SUBCHANNEL SELECTION AND CHANNEL STATE INFORMATION (CSI) INDICATION VIA BUFFER STATUS REPORT (BSR) FOR SIDELINK

(71) Applicant: QUALCOMM INCORPORATED, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/249,409

(22) Filed: Mar. 1, 2021

(65) Prior Publication Data
US 2022/0279377 A1    Sep. 1, 2022

(51) Int. Cl.
*H04W 28/02* (2009.01)
*H04B 7/0456* (2017.01)
(Continued)

(52) U.S. Cl.
CPC ...... *H04W 28/0278* (2013.01); *H04B 7/0486* (2013.01); *H04B 7/0626* (2013.01);
(Continued)

(58) Field of Classification Search
CPC ............. H04W 28/0278; H04W 72/02; H04W 72/0453; H04W 72/1263; H04W 72/14;
(Continued)

(56) References Cited

U.S. PATENT DOCUMENTS

| 2019/0239112 A1* | 8/2019 | Rao | H04W 4/70 |
| 2020/0029353 A1* | 1/2020 | Xu | H04W 52/0209 |

(Continued)

FOREIGN PATENT DOCUMENTS

| WO | 2020063221 A1 | 4/2020 | |
| WO | WO-2021030565 A1 * | 2/2021 | ........ H04W 72/0406 |

OTHER PUBLICATIONS

3GPP TS 36.321: "3rd Generation Partnership Project; Technical Specification Group Radio Access Network; Evolved Universal Terrestrial Radio Access (E-UTRA); Medium Access Control (MAC) Protocol Specification (Release 16)", 3GPP Standard, Technical Specification, 3GPP TS 36.321, 3rd Generation Partnership Project (3GPP), Mobile Competence Centre, 650, Route Des Lucioles, F-06921, Sophia-Antipolis Cedex, France, vol. RAN WG2, (Dec. 2020), No. V16.3.0, Jan. 6, 2021 (Jan. 6, 2021), pp. 1-142, XP051999531, [Cont'd in Box 2].
(Continued)

*Primary Examiner* — Yu-Wen Chang
(74) *Attorney, Agent, or Firm* — Haynes and Boone LLP

(57) ABSTRACT

Wireless communications systems and methods related to providing subchannel selection or recommendation and/or channel state information (CSI) for sidelink communications (e.g., operating in mode-1 radio resource allocation (RRA) via a buffer status report (BSR) are provided. A first user equipment (UE) transmits, to a base station (BS), a BSR indicating subchannel information associated with one or more UEs. The UE receives, from the BS in response to the BSR report, a grant for transmitting a first sidelink transmission to a second UE of the one or more UEs. The UE transmits, to the second UE based on the grant, the first sidelink transmission.

28 Claims, 12 Drawing Sheets

(51) Int. Cl.
*H04B 7/06* (2006.01)
*H04W 72/02* (2009.01)
*H04W 72/0453* (2023.01)
*H04W 72/1263* (2023.01)
*H04W 72/14* (2009.01)
*H04W 80/02* (2009.01)

(52) U.S. Cl.
CPC .......... *H04B 7/0632* (2013.01); *H04W 72/02* (2013.01); *H04W 72/0453* (2013.01); *H04W 72/1263* (2013.01); *H04W 72/14* (2013.01); *H04W 80/02* (2013.01)

(58) Field of Classification Search
CPC ... H04W 80/02; H04B 7/0486; H04B 7/0626; H04B 7/0632
See application file for complete search history.

(56) References Cited

U.S. PATENT DOCUMENTS

| | | | | |
|---|---|---|---|---|
| 2020/0037190 | A1* | 1/2020 | Wu | H04W 24/10 |
| 2020/0351704 | A1* | 11/2020 | Yu | H04W 28/0278 |
| 2021/0144750 | A1* | 5/2021 | Cao | H04W 72/0446 |
| 2021/0195613 | A1* | 6/2021 | Agiwal | H04W 72/14 |
| 2021/0219169 | A1 | 7/2021 | Ji | |
| 2021/0352682 | A1* | 11/2021 | Zheng | H04W 72/1231 |
| 2022/0077991 | A1* | 3/2022 | Hwang | H04W 72/1278 |
| 2022/0104209 | A1* | 3/2022 | Lee | H04W 28/0278 |
| 2022/0116925 | A1* | 4/2022 | Fouad | H04W 72/02 |
| 2022/0217743 | A1* | 7/2022 | Zhou | H04W 72/1284 |

OTHER PUBLICATIONS

[Cont'd from Box 1] Retrieved from the Internet: URL: https://ftp.3gpp.org/Specs/archive/36_series/36.321/36321-g30.zip 36321-g30docx [retrieved on Jan. 6, 2021] paragraph [6.1 3.1a] paragraph [5.14.1.4].
CATT: "Sidelink SR/BSR in Uu Interface", 3GPP Draft, R2-1900219, 3GPP TSG-RAN WG2 Meeting #105, 3rd Generation Partnership Project (3GPP), Mobile Competence Centre, 650, Route Des Lucioles, F-06921, Sophia-Antipolis Cedex, France, Feb. 15, 2019 (Feb. 15, 2019), pp. 1-5, XP051601618, pp. 1-5.
Dahlman E., et al., "Scheduling" In: "5G NR", Jan. 1, 2021 (Jan. 1, 2021), Elsevier, XP055926218, ISBN: 978-0-12-822320-8, pp. 299-323, DOI:10.1016/B978-0-12-822320-8.00014-3, paragraph [14.2], figure 14.3.
Dahlman E., et al., "Sidelink Communication" In: "5G NR", Jan. 1, 2021 (Jan. 1, 2021), Elsevier, XP055926219, ISBN: 978-0-12-822320-8, pp. 457-477, DOI:10.1016/B978-0-12-822320-8, 00023-4, paragraph [23.4.3] paragraph [23.4.1.1].
Huawei, et al., "Sidelink Physical Layer Structure and Procedure for NR V2X", 3GPP Draft, R1-1808093, 3GPP TSG RAN WG1 Meeting #94, 3rd Generation Partnership Project (3GPP), Mobile Competence Centre, 650, Route Des Lucioles, F-06921, Sophia-Antipolis Cedex, France, vol. Ran WG1, No. Gothenburg, Sweden, Aug. 20, 2018-Aug. 24, 2018, Aug. 10, 2018 (Aug. 10, 2018), XP051515495, 6 Pages, Retrieved from the Internet: URL: http://www.3gpp.org/ftp/tsg%5Fran/WG1%5FRL1/TSGR1%5F94/Docs/R1%2D1808093%2Ezip [retrieved on Aug. 10, 2018] paragraph [02.3].
International Search Report and Written Opinion—PCT/US2022/018065—ISA/EPO—dated Jun. 10, 2022.

* cited by examiner

SUBCHANNEL SELECTION AND CHANNEL STATE INFORMATION (CSI) INDICATION VIA BUFFER STATUS REPORT (BSR) FOR SIDELINK

TECHNICAL FIELD

This application relates to wireless communication systems, and more particularly to providing subchannel selection or recommendation and/or channel state information (CSI) for sidelink communications via a buffer status report (BSR).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a first user equipment (UE). The method includes transmitting, to a base station (BS), a buffer status report (BSR) indicating subchannel information associated with one or more UEs; receiving, from the BS in response to the BSR report, a grant for transmitting a first sidelink transmission to a second UE of the one or more UEs; and transmitting, to the second UE based on the grant, the first sidelink transmission.

In an additional aspect of the disclosure, a method of wireless communication performed by a base station (BS). The method includes receiving, from a first user equipment (UE), a buffer status report (BSR) indicating subchannel information associated with one or more UEs; and transmitting, to the first UE in response to the BSR report, a grant for transmitting a first sidelink transmission to a second UE of the one or more UEs.

In an additional aspect of the disclosure, a first user equipment (UE) includes a processor; and a transceiver coupled to the processor, where the transceiver is configured to transmit, to a base station (BS), a buffer status report (BSR) indicating subchannel information associated with one or more UEs; receive, from the BS in response to the BSR report, a grant for transmitting a first sidelink transmission to a second UE of the one or more UEs; and transmit, to the second UE based on the grant, the first sidelink transmission.

In an additional aspect of the disclosure, a base station (BS) includes a processor; and a transceiver coupled to the processor, where the transceiver is configured to receive, from a first user equipment (UE), a buffer status report (BSR) indicating subchannel information associated with one or more UEs; and transmit, to the first UE in response to the BSR report, a grant for transmitting a first sidelink transmission to a second UE of the one or more UEs.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
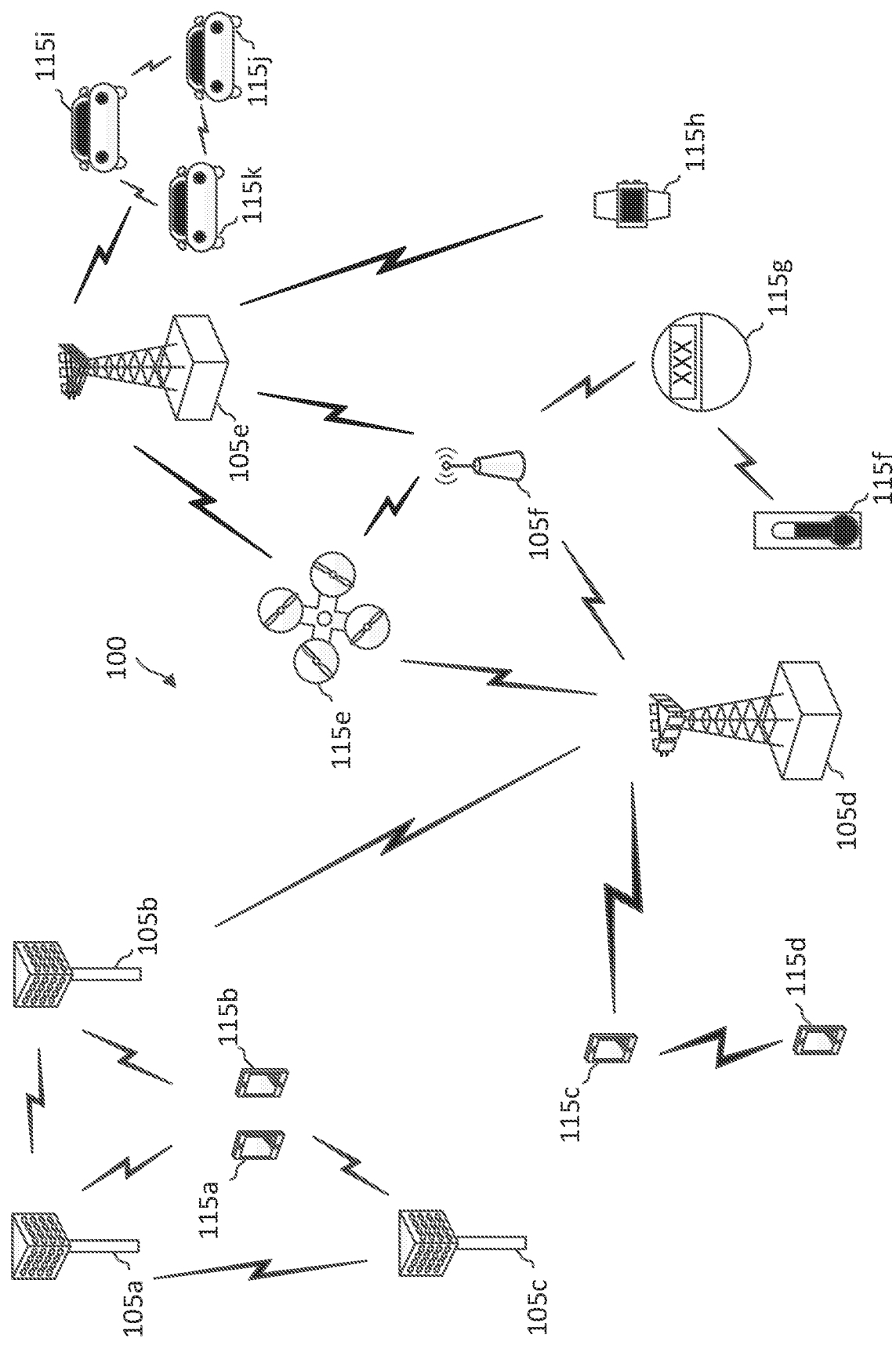
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., —10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a sidelink transmitting UE at one time and as a sidelink receiving UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. In some instances, the serving BS may also configure the sidelink UE to broadcast synchronization signals and/or system information to facilitate sidelink communications using mode-2 RRA.

In some aspects, sidelink may be communicated over a shared radio frequency band (e.g., in a shared spectrum or an unlicensed spectrum). For instance, NR-U sidelink may refer to the deployment of NR sidelink over an unlicensed frequency band. One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle or clear, the transmitting node may transmit a reservation signal (e.g., a preamble) to reserve a channel occupancy time (COT) in the shared channel and may communicate with a receiving node during the COT. If, however, the channel is busy or occupied, the transmitting node may not transmit in the shared channel.

In some aspects, NR-U sidelink may be deployed over a wideband bandwidth part (BWP). The wide BWP may be divided into multiple LBT subchannels, where a sidelink transmitting UE may conduct an LBT in each subchannel and transmit a sidelink communication to a sidelink receiving UE in a subchannel with an LBT pass (e.g., indicating a clearance for transmission). As an example, the wideband BWP may have a frequency bandwidth of 100 megahertz (MHz), and may be divided into five LBT subchannels each with a 20 MHz frequency bandwidth. When a sidelink operates in mode-1 RRA, a BS serving the sidelink transmitting UE may select and/or allocate a resource (e.g., a time-frequency resource) in a subchannel for the sidelink transmitting UE, and the sidelink transmitting UE may perform an LBT in the allocated subchannel and determine whether to transmit using the allocated resource based on the LBT result.

In some aspects, the BS may select a lowest-frequency subchannel as a starting subchannel and determine a number of subchannels (starting from the starting subchannel) that the sidelink transmitting UE may use for a sidelink transmission (to a sidelink receiving UE). The BS may allocate one or more resources (e.g., time-frequency resources) in the selected subchannel(s) for the transmitting sidelink UE. The BS may transmit a scheduling grant indicating a resource allocation to the sidelink transmitting UE. In some instances, the BS may also configure the sidelink transmitting UE with certain transmission parameters (e.g., a modulation coding scheme (MCS)). In some aspects, the BS may transmit the sidelink transmission grant in the form of downlink control information (DCI) (e.g., DCI format 3_0) via a physical downlink control channel (PDCCH).

In some aspects, sidelink transmission may employ hybrid automatic repeat request (HARQ) techniques to improve reliability. For sidelink transmissions that utilize HARQ techniques, the BS may allocate up to two resources for the sidelink transmitting UE. For instance, the BS may select a starting subchannel and a number of subchannels and may allocate a first resource and a second resource in the selected subchannels for the sidelink transmitting UE. The first resource may be used for an initial transmission by the sidelink transmitting UE. The second resource may be used a retransmission by the sidelink transmitting UE. For instance, the sidelink transmitting UE may transmit a data packet to the sidelink receiving UE for the first time using the first resource. If the sidelink receiving UE receives and decode the data correctly, the sidelink receiving UE transmits an acknowledgement (ACK) to the sidelink transmitting UE and the sidelink transmitting UE may not use the second resource. If, however, the sidelink receiving UE fails to decode the data from the first resource, the sidelink receiving UE may transmit a negative-acknowledgement (NACK) to the sidelink transmitting UE. Upon receiving the NACK, the sidelink transmitting UE may retransmit the data packet to the sidelink receiving UE using the second resource.

While mode-1 RRA can allow for a centralized resource management at the BS, the BS may not be aware of interference experienced by a sidelink receiving UE. As such, the BS may estimate channel conditions and/or interference conservatively when selecting a subchannel (e.g., frequency resource) for a sidelink transmitting UE. Thus, a BS managing sidelink with mode-1 RRA may not be able to optimize or maximize spectral efficiency and/or resource utilization.

In some aspects, the sidelink transmitting UE can determine or adapt a MCS (indicated by a transmission grant) based on channel characteristics or quality of a sidelink channel between the sidelink transmitting UE and a corresponding sidelink receiving UE. To that end, the sidelink transmitting UE may transmit reference signals (e.g., channel state information-reference signal (CSI-RS)) to the sidelink receiving UE. The CSI-RS may have a predetermined waveform known to the sidelink receiving UE. Upon receiving the CSI-RS, the sidelink receiving UE may determine channel measurements or CSI based on the reference signals. Some examples of CSI may include a rank indicator (RI) (e.g., a transmission rank or spatial layers) and/or a channel quality indicator (CQI). For instance, the sidelink receiving UE may determine a channel estimate based on the received CSI-RS and the known CSI-RS waveform. The sidelink receiving UE may determine rank information (e.g., the RI representing a transmission rank or a number of spatial layers) from the channel estimate. The sidelink receiving UE may also determine a received signal measurement for the received CSI-RS and may determine the channel quality (e.g., the CQI) based on the received signal measurement. In some instances, the received signal measurement may be a layer 1-reference signal received power (L1-RSRP) and the CQI is a quantized L1-RSRP (e.g., with about 16 quantization levels). The sidelink receiving UE may report the determined CSI to the sidelink transmitting UE. In this way, the sidelink transmission UE may determine or adapt the MCS based on the CSI report.

In NR-U sidelink, traffic may occur in bursts at irregular time intervals. Furthermore, each individual LBT subchannel in a BWP over an unlicensed frequency band may experience different levels of interference due to sharing of the unlicensed frequency band with WiFi devices, which may also apply channelization for transmissions. For instance, a WiFi device may transmit data over a certain subchannel (e.g., of 10 MHz BW) in the unlicensed frequency band. As such, frequency diversity (or interference variations) over a wide BWP (of 100 MHz bandwidth) may be substantial. Accordingly, it may be desirable for the BS to have CSI about a sidelink channel so that the BS may make better decision in selecting appropriate subchannel(s) for a sidelink transmission in the sidelink channel.

In some aspects, a BS may obtain sidelink CSI from a sidelink transmitting UE or a sidelink receiving UE. In one example, a sidelink receiving UE may transmit a CSI report associated with a sidelink channel to a corresponding sidelink transmitting UE (over a sidelink interface, which may be referred to as a PC5 interface), and the sidelink transmitting UE may forward the CSI report to the BS (over a direct link interface, which may be referred to as a uU interface). In another example, a sidelink receiving UE may transmit a CSI report associated with a sidelink channel directly to the BS. The transmission of the CSI report from the sidelink transmitting UE or the sidelink receiving UE to the BS may be via MAC-CE signaling (over a physical uplink shared channel (PUSCH)) or uplink control information (UCI) signaling (over a physical uplink control channel (PUCCH)). While a sidelink receiving UE may transmit a sidelink CSI report directly to a BS or indirectly to the BS (via a corresponding sidelink transmitting UE) to assist the BS in performing sidelink resource allocation, the CSI report transmissions utilize additional PUSCH or PUCCH resources. Additionally, the BS may utilize resources to transmit a transmission grant to indicate the allocated PUSCH or PUCCH resources. Furthermore, each transmission may invoke an LBT, which may have a certain processing overhead or delay and may involve a channel access uncertainty. Accordingly, such CSI reporting mechanisms can impact sidelink system throughput, and thus may not be desirable.

The present disclosure describes mechanisms for providing subchannel selection or recommendation and/or CSI for sidelink communications in mode-1 RRA via an enhanced buffer status report (BSR). For example, a first UE (a sidelink transmitting UE) may communicate sidelink with one or more UEs over one or more subchannels of a plurality of subchannels. The sidelink communications may operate in mode-1 RRA, where a serving BS may schedule and allocate resources for sidelink transmissions. When the first UE has data ready for transmission to the one or more UEs (sidelink receiving UEs), the first UE may request sidelink transmission resources from the BS by transmitting a BSR to the BS. A BSR may typically include one or more entries or blocks each including a sub-header field indicating a destination index and a logical channel group (LCG) identifier (ID). The destination index identifies a target sidelink receiving UE, and the LCG ID identifies a group of logical channels associated with data for the target sidelink receiving UE. For example, transport channels for sidelink communications may include a sidelink broadcast channel (SL-BCH) and a sidelink shared channel (SL-SCH), and logical channels for sidelink communications may include sidelink broadcast control channel (SBCCH), sidelink control channel (SCCH) and sidelink traffic channel (STCH). The SBCCH may be used for carrying synchronization signals and/or system information for broadcast and may be mapped to SL-BCH, which may then be mapped to PSBCH. The SCCH may be mapped to SL-SCH, which may then be mapped to PSCCH. The STCH may be mapped to SL-SCH, which may then be mapped to PSSCH. A LCG ID may be unique between a pair of sidelink transmitting UE and sidelink receiving UE. Each entry or block in the BSR further includes a buffer size field following a corresponding sub-header field. The buffer size field may indicate an amount of data (e.g., a number of bytes) that is queued up or buffered (e.g., at a memory of the sidelink transmitting UE) for the identified group of logical channels.

According to aspects of the present disclosure, to assist the BS in allocating resources (e.g., time-frequency resources) from suitable subchannels for communicating with the one or more UEs, the first UE may include subchannel information associated with the one or more UEs in the BSR. A suitable subchannel may refer to a subchannel with a high signal-to-noise ratio (SNR) or a high signal-to-interference-plus-noise ratio (SINR) (e.g., satisfying a threshold) measured at a sidelink receiving UE. For instance, the BSR may include a first entry or block including a destination index identifying a second UE of the one or more UEs, a LCG ID identifying a group of logical channels associated with the second UE, a buffer size indicating an amount of data stored at a buffer (or memory) of the first UE and associated with the group of logical channels, and subchannel information associated with the second UE.

In some aspects, the subchannel information may indicate at least one of one or more preferred subchannels (selected from the plurality of subchannels) or a number of subchannels. For instance, the first UE may include, in the BSR, a list of subchannels arranged in an order of preference for transmitting data to the second UE. In some other instances, the first UE may include, in the BSR, a joint indication (codeword) of a preferred starting subchannel and a number of contiguous subchannels (starting from the preferred starting subchannel) for transmitting data (queued at the first UE's buffer(s)) for all LCG IDs associated with the second UE. In yet some other instances, the first UE may include, in the BSR, a list of preferred subchannels and an indication of a number of subchannels in the list of preferred subchannels for transmitting data (queued at the first UE's buffer(s)) for all LCG IDs associated with the second UE.

In other aspects, the subchannel information may include CSI (e.g., RI and/or CQI) for one or more subchannels of the plurality of subchannels. For instance, the first UE may include, in the BSR, CSI for each of the one or more subchannels. In some aspects, the first UE may determine the preferred subchannels and/or obtain the CSI based on CSI reported by the second UE. To that end, the first UE may transmit a CSI-RS in each subchannel, and the second UE may report CSI for each subchannel (e.g., based on channel estimate and/or received signal measurement determined from each respective CSI-RS) to the first UE.

In some aspects, upon receiving the BSR from the first UE, the BS may allocate one or more resources for the second UE based on the subchannel information in the BSR. For instance, the BS may allocate the one or more resources from subchannels that are recommended or preferred by the first UE (as indicated by the BSR). The BS may transmit, to the first UE, a transmission grant indicating the allocated resource(s). Upon receiving the transmission grant, the first UE may transmit data to the second UEs using the indicated resource(s).

The first UE may arrange subchannel information in a BSR in various ways. In some aspects, the first UE may expand each entry or block in the BRS. As explained above, an entry or block in a BSR may include a sub-header (including a destination index and a LCG ID) followed by an indication of a buffer size. The first UE may add a subchannel information field after a buffer size field in each entry of the BSR. In some instances, an enhanced BSR may multiple entries or blocks, where each block may be associated with one receiving UE and one LCG ID and may have a fixed size (e.g., 3 octets long). For instance, the BSR can include a first block including a destination index, a first LCG ID, a buffer size, and first subchannel information associated with the second UE. The BSR can further include a second block again for the second UE, but for a different LCG ID. For instance, the second block may include the destination index, a second LCG ID different from the first LCG ID, a second buffer size, and second subchannel information associated with the second UE. Additionally or alternatively, the BSR can further include a third block associated with a different UE than the second UE. For instance, the third block may include a third destination index, a third LCG ID, a third buffer size, and third subchannel information associated with a third UE of the one or more UEs. In some aspects, depending on the number of preferred subchannels for a target receiving UE, the subchannel information field in an entry or a block may not be sufficient in indicating all the preferred subchannels, and thus the BSR can include multiple entries with the same destination index and the same LCG ID, but different subchannel information. In some aspects, the first UE may transmit a medium access control-control element (MAC-CE) carrying the BSR including entries expanded with the subchannel information field.

In other aspects, the first UE may group buffer information for the one or more UEs into a first group block and subchannel information associated with the one or more UEs into a second group block. The first UE may include, in the BSR, the first group block followed by the second group block. For instance, the first group block may include a destination index, a LCG ID, and a buffer size associated with the second UE, and the second group block may include first subchannel information associated with the second UE and at least one of the destination index or the LCG ID. The first UE may further include, in the first group block, buffer information (e.g., a buffer size) for a different LCG ID of the second UE and/or a LCG ID of a third UE of the one or more UEs. Similarly, the first UE may include, in the second group block, subchannel information (e.g., a list of preferred subchannels, a number of subchannels, and/or CSI) for a different LCG ID of the second UE and/or subchannel information for a LCG ID of a third UE of the one or more UEs. In one aspect, the first UE may transmit a single MAC-CE including the first group block and the second group block. In another aspect, the first UE may transmit a bundled MAC-CE including a first MAC-CE including the first group block and a second MAC-CE including the second group block. In some aspects, the first MAC-CE may be similar to a legacy BSR MAC-CE in 3GPP, and the second MAC-CE may be a resource recommendation MAC-CE.

Aspects of the present disclosure can provide several benefits. For example, the inclusion of sidelink subchannel information (e.g., preferred subchannels and/or CSI) in a BSR by a sidelink transmitting UE can assist a BS in selecting suitable subchannel(s) for the sidelink transmitting UE to transmit a sidelink transmission. Hence, the BS may be able to optimize spectral efficiency and/or resource utilization instead of allocating sidelink resource(s) conservatively and/or over-provisioning based on a conservative channel estimate. Additionally, the inclusion of sidelink subchannel information in a BSR can minimize processing overhead and/or delay and/or resource overhead. As explained above, the BS and the sidelink UEs may communicate over a shared radio frequency band or unlicensed band where each transmission may invoke an LBT, which may have a certain processing delay or overhead and channel access uncertainty. Since BSR(s) are being transmitted by a sidelink transmitting UE to request sidelink resource(s) anyway, the inclusion of sidelink subchannel information in the BSR does not invoke a separate or additional LBT at the sidelink transmitting UE. Accordingly, the present disclosure can enable efficient sidelink communications with mode-1 RRA.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel Conversely, the LBT results in a failure when a channel reservation signal is detected in the channel A TXOP may also be referred to as channel occupancy time (COT).

Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

In some aspects, the network 100 may provision for sidelink communications to allow a UE 115 to communicate with another UE 115 without tunneling through a BS 105 and/or the core network. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. SCI may also carry information to reserve future resources (e.g., up to about two future PSSCH for retransmissions with HARQ). In some examples, a sidelink transmitting UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include an 8-bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

As explained above, sidelink may operate in mode-1 RRA or mode-2 RRA. In some aspects, In some aspects, a pair of sidelink transmitting UE 115 and sidelink receiving UE 115 may communicate with each other based on mode-1 RRA as discussed above, where a BS 105 may allocate a resource for the sidelink transmitting UE 115 to transmit data to the sidelink receiving UE 115. According to aspects of the present disclosure, a sidelink transmitting UE 115 may transmit a BSR including subchannel information to a serving BS 105. The BSR may indicate one or more destination IDs and corresponding LCG IDs, and subchannel information associated with the destination IDs. For instance, a destination ID may identify a sidelink receiving UE 115 that the sidelink transmitting UE 115 has data ready for transmission to. The data may be associated with a logical channel within a LCG identified by the LCG ID. Examples of logical channels may include sidelink traffic channels (STCH) for carrying user data (to be transmitted via a PSSCH) and/or sidelink broadcast channel (SBCCH) for carrying synchronization signals and/or system information for broadcast (over a physical sidelink broadcast channel (PSBCH)). The buffer size may indicate a size of the data (e.g., in units of bytes). The subchannel information may provide channel information associated with a sidelink channel between the sidelink transmitting UE 115 and the sidelink receiving UE 115. For instance, the sidelink channel may be over a wideband BWP (e.g., with a bandwidth of 100 MHz). The wideband BWP may be divided into a plurality of subchannels, where the sidelink transmitting UE 115 may conduct an LBT in each subchannel and transmit a sidelink communication to a sidelink receiving UE in a subchannel with an LBT pass (e.g., clear for transmission).

In one aspect, the sidelink transmitting UE 115 may include, in subchannel information, an indication of at least one of one or more subchannels or a number of subchannels that are preferred for communicating with the sidelink receiving UE 115. For instance, the sidelink transmitting UE 115 may transmit one or more reference signal (e.g., CSI-RS) in each of one or more subchannels of the plurality of subchannels to the sidelink receiving UE 115. The sidelink receiving UE 115 may report CSI (e.g., RI, CQI, etc.) for each of the one or more reference signals to the sidelink transmitting UE 115. The sidelink transmitting UE 115 may determine the at least one of the one or more subchannels or the number of subchannels from the plurality of channels based on the received CSI report. In another aspect, the sidelink transmitting UE 115 may include, in the subchannel information, an indication of at least one of RI, a CQI, or a subchannel index associated with the sidelink receiving UE 115. The RI and CQI may be based on CSI report(s) received from the sidelink receiving UE 115. Mechanisms for indicating sidelink subchannel information via a BSR are described in greater detail herein.

Upon receiving the BSR from the sidelink transmitting UE 115, the BS 105 may determine a resource for the sidelink transmitting UE 115 to transmit a sidelink. In this regard, the BS 105 may select a subchannel based on the subchannel information indicated by the BSR and allocate the resource in the selected subchannel. The BS 105 may determine a resource size (e.g., number of symbols and/or subcarrier) based on the buffer size indicated by the BSR. The BS 105 may transmit a sidelink transmission grant indicating the allocating resource to the sidelink transmitting UE 115. Upon receiving the sidelink transmission grant, the sidelink transmitting UE 115 may transmit sidelink data to the sidelink receiving UE 115 in accordance with the sidelink transmission grant.

Figure 2:
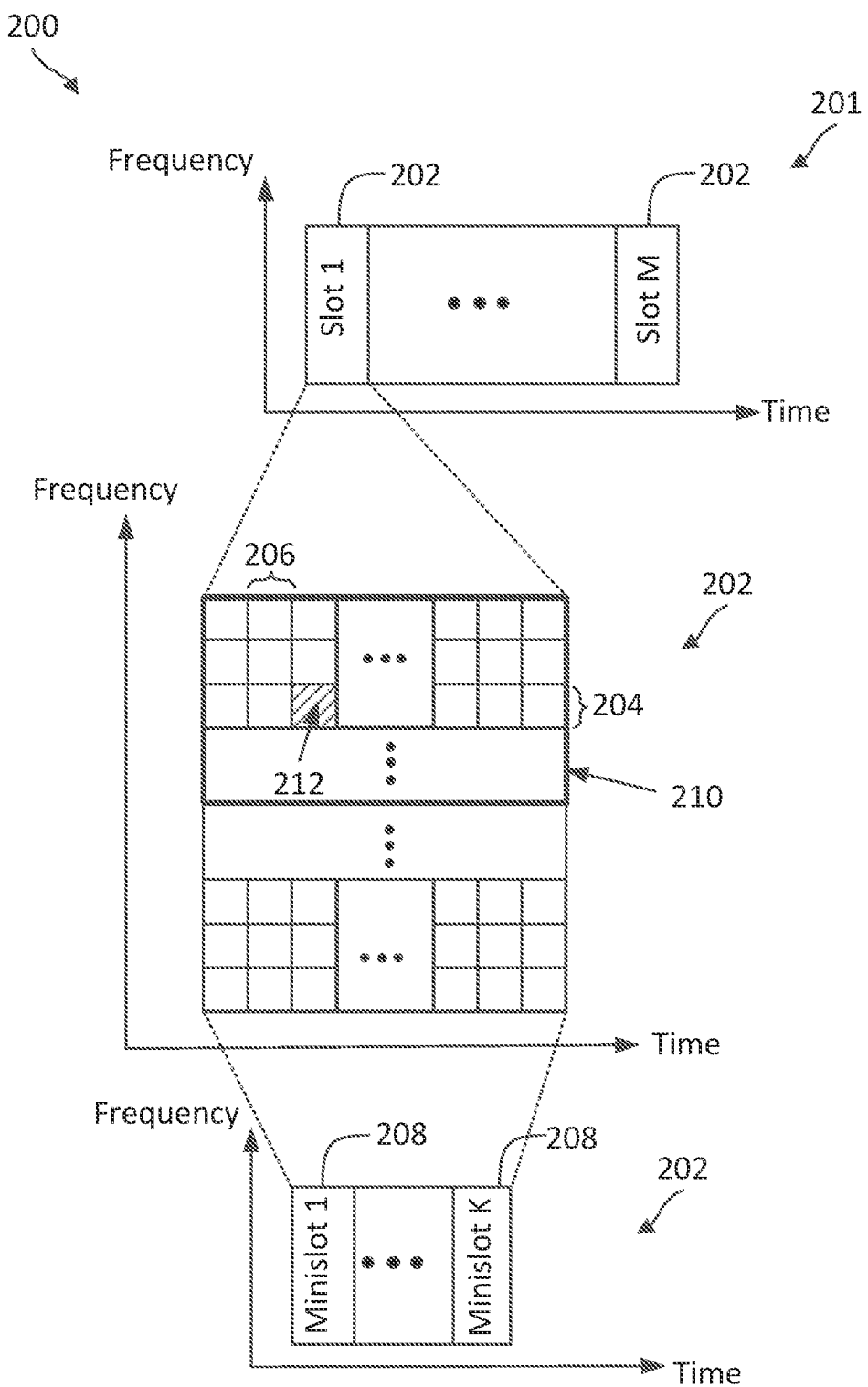
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. The UE may also communicate sidelink with another UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , or 14 symbols).

Figure 3A:
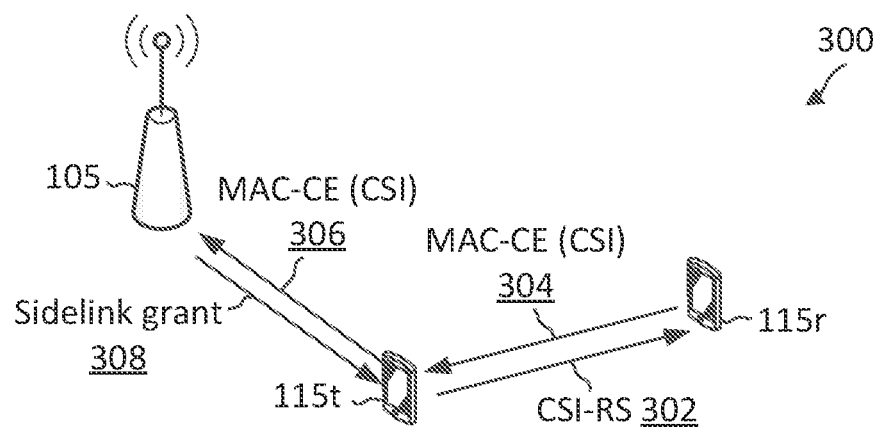
FIG. 3A illustrates a sidelink communication scenario according to some aspects of the present disclosure.
Figure 3B:
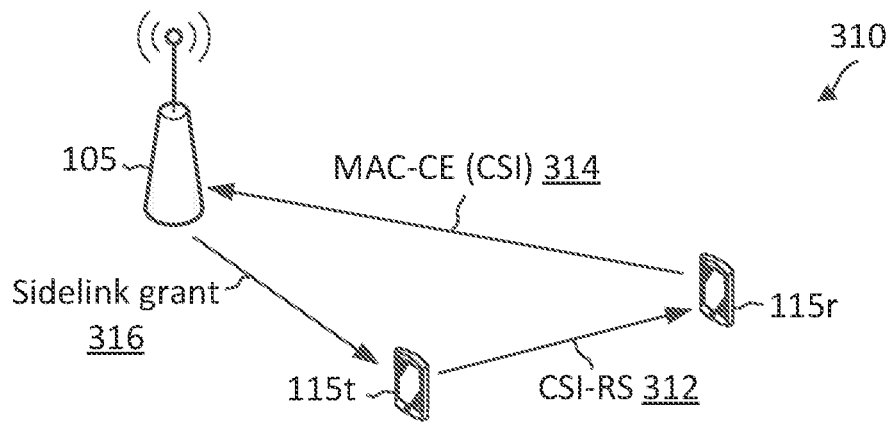
FIG. 3B illustrates a sidelink communication scenario according to some aspects of the present disclosure.
Figure 3C:
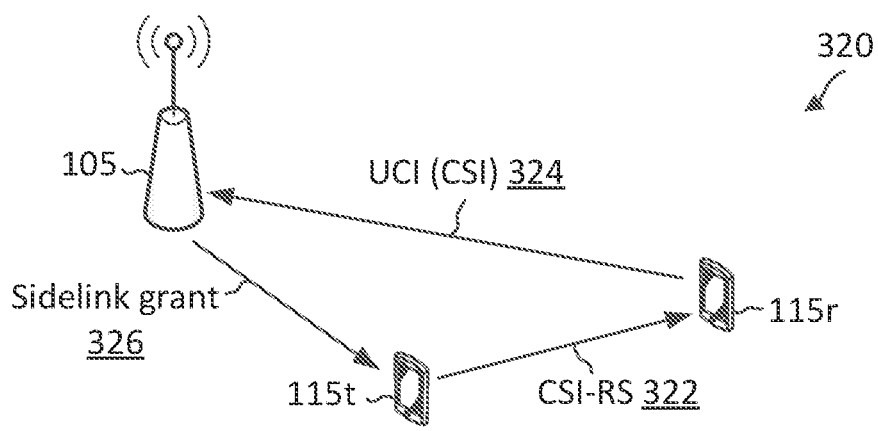
FIG. 3C illustrates a sidelink communication scenario according to some aspects of the present disclosure.

As explained above, when sidelink communicate is over a wideband BWP (with a 100 MHz bandwidth) in an unlicensed frequency band, channel conditions can vary substantially across the wideband BWP due to sharing of the unlicensed frequency band with WiFi devices, which may also apply channelization for transmissions. Accordingly, it may be desirable for the BS to have CSI related to the sidelink channels when sidelink communication operate in mode-1 RRA, where sidelink resources are allocated and granted by a BS 105. FIGS. 3A-3C illustrate various mechanisms sidelink communications with mode-1 RRA.

FIG. 3A illustrates a sidelink communication scenario 300 according to some aspects of the present disclosure. The scenario 300 may correspond to a sidelink communication scenario in the network 100. For simplicity, the scenario 300 includes one BS 105 and two UEs 115 (shown as 115$t$ and 115$r$), but a greater or fewer number of each type of device may be supported. In the scenario 300, the BS 105 may serve at least the UE 115$t$ over a direction link uU interface. In other words the UE 115$t$ is within a coverage of the BS 105.

The UE 115*t* may have a RRC connection established with the BS 105. The BS 105 may also serve the UE 115*r*. The UE 115*t* may be in communication with the UE 115*r* over a sidelink or PC5 interface. For instance, the UE 115*t* may be a sidelink transmitting UE that has data for transmission to the UE 115*r*, and the UE 115*r* may be a sidelink receiving UE that receives data from the sidelink transmitting UE 115*t*. In some instances, the sidelink channel (PC5 interface) may be over a wideband BWP (e.g., with a bandwidth of about 100 MHz) in an unlicensed spectrum. The wideband BWP may be divided into multiple LBT subchannels.

In the scenario 300, sidelink communications operate in mode-1 RRA. In other words, the BS 105 may allocate sidelink resources for the sidelink transmitting UE 115*t* to communicate with the sidelink receiving UE 115*r*. To facilitate sidelink resource allocation, the sidelink transmitting UE 115*t* may provide the BS 105 with CSI related to the sidelink channel. As shown, at action 302, the sidelink transmitting UE 115*t* transmits a CSI-RS to the sidelink receiving UE 115*r* over the sidelink channel. The CSI-RS may be predetermined waveform sequence known to the sidelink receiving UE 115*r*. Upon receiving the CSI-RS, the sidelink receiving UE 115*r* may perform channel measurements. In this regard, the sidelink receiving UE 115*r* may determine rank information and/or a channel quality. The sidelink receiving UE 115*r* may determine a channel estimate based on the received CSI-RS and the known CSI-RS waveform and may determine rank information (e.g., a RI representing a transmission rank) from the channel estimate. The sidelink receiving UE 115*t* may also determine received signal measurement (e.g., a layer 1-reference signal received power (L1-RSRP)) for the received CSI-RS and may determine the channel quality (e.g., a CQI) based on the received signal measurement (e.g., by quantizing the L1-RSRP based on a number of CQI levels).

At action 304, the sidelink receiving UE 115*r* transmits a CSI report to the sidelink transmitting UE 115*t*. The CSI report may be carried in a MAC-CE over a PSSCH. For instance, the CSI report may include a 1-bit RI and/or a 4-bit CQI. The RI may indicate a bit value of 0 for a first transmission rank and a bit value of 1 for a second transmission rank. The CQI may indicate a quantized value representing the L1-RSRP.

At action 306, upon receiving the CSI report from the sidelink receiving UE 115*r*, the sidelink transmitting UE 115*t* forwards (soft relay) the CSI report (e.g., the MAC-CE) over a PUSCH to the BS 105. Upon receiving the CSI report at the BS 105, the BS 105 may determine a resource for the sidelink transmitting UE 115*t* based on the CSI report. In this regard, the BS 105 may select one or more subchannels that are suitable (e.g., with a high SNR or SINR) for the sidelink transmitting UE 115*t* to transmit a sidelink transmission and may allocate the resource from the selected subchannel(s). The sidelink resource may include one or more symbols (e.g., the symbols 206) and one or more subcarriers (e.g., the subcarriers 204). For instance, the BS 105 may allocate a first resource in one of the selected subchannels for the sidelink transmitting UE 115*t* to transmit an initial transmission and a second resource in one of the selected subchannels for the sidelink transmitting UE 115*t* to transmit a HARQ retransmission.

At action 308, the BS 105 transmits a sidelink grant to the sidelink transmitting UE 115*t*. The sidelink grant may indicate the allocated sidelink resource(s). Upon receiving the sidelink transmission grant, the sidelink transmitting UE 115*t* may transmit sidelink data to the sidelink receiving UE 115*r* using the resource(s) indicated by the sidelink transmission grant. For instance, the sidelink transmitting UE 115*t* may transmit a data packet to the sidelink receiving UE 115*r* using the first resource and may retransmit the data packet to the sidelink receiving UE 115*r* using the second resource upon receiving a NACK (for the data packet) from the sidelink receiving UE 115*r*.

FIG. 3B illustrates a sidelink communication scenario 310 according to some aspects of the present disclosure. The scenario 310 may correspond to a sidelink communication scenario in the network 100. The scenario 310 may be substantially similar to the scenario 300. For instance, the BS 105 may allocate sidelink resources for the sidelink transmitting UE 115*t* to transmit data to the sidelink receiving UE 115*r*. However, in the scenario 310, the sidelink receiving UE 115*r* may transmit a CSI report directly to the BS 105. As shown, at action 312, the sidelink transmitting UE 115*t* transmits a CSI-RS to the sidelink receiving UE 115*r*. Upon receiving the CSI-RS, the sidelink receiving UE 115*r* may determine rank information (e.g., a transmission rank) and/or a channel quality (e.g., a layer 1-reference signal received power (L1-RSRP)) based on the received CSI-RS.

At action 314, the sidelink receiving UE 115*r* transmits a CSI report (e.g., indicating RI and/or CQI for one or more subchannels) to the BS 105. The CSI report may be carried in a MAC-CE transmitted via a PUSCH (over a uU interface between the sidelink receiving UE 115*r* and the BS 105). Upon receiving the CSI report at the BS 105, the BS 105 may determine a resource for the sidelink transmitting UE 115*t* based on the CSI report as discussed above in the scenario 300.

At action 316, the BS 105 transmit a sidelink grant to the sidelink transmitting UE 115*t*. The sidelink grant may indicate the allocated sidelink resource(s). Upon receiving the sidelink transmission grant, the sidelink transmitting UE 115 may transmit sidelink data to the sidelink receiving UE 115*r* using the resource(s) indicated by the sidelink transmission grant.

The scenario 310 can be more efficient than the scenario 300 since the sidelink receiving UE 115*r* transmits the CSI report directly to the BS 105. However, in order for the sidelink receiving UE 115*r* to transmit the CSI report directly to the BS 105, the sidelink receiving UE 115*r* has to be within the coverage of the BS 105.

FIG. 3C illustrates a sidelink communication scenario 320 according to some aspects of the present disclosure. The scenario 320 may correspond to a sidelink communication scenario in the network 100. Generally speaking, the scenario 320 includes features similar to scenario 310 in many respects. For example, actions 322, 324, and 326 are similar to the actions 312, 314, and 316, respectively. Accordingly, for sake of brevity, details of those steps will not be repeated here.

The scenario 320 differs from the scenario 310 by the transmission of the CSI report from the sidelink receiving UE 115*r* to the BS 105. As shown, at action 324, the sidelink receiving UE 115*r* transmits the CSI report in the format of uplink control information (UCI), for example, via a PUCCH over the uU interface instead of via a MAC-CE over a PUSCH.

Similar to the scenario 310, the scenario 320 can be more efficient than the scenario 300 since the sidelink receiving UE 115*r* transmits the CSI report directly to the BS 105, but the sidelink receiving UE 115*r* has to be within the coverage of the BS 105.

As can be observed from FIGS. 3A-3C, the transmission of a CSI report from the sidelink transmitting UE 115*t* or from the sidelink receiving UE 115*r* via a MAC-CE over a PUSCH or via UCI over a PUCCH can increase resource and signaling overhead. Furthermore, when operating over an unlicensed frequency band, each transmission may invoke an LBT, which may have a certain processing overhead or delay and may involve a channel access uncertainty. Accordingly, such CSI reporting mechanisms can impact sidelink system throughput, and thus may not be desirable.

Accordingly, the present disclosure provides techniques for a sidelink transmitting UE to indicate sidelink subchannel information (e.g., in the form of preferred subchannels, a number of subchannels, or CSI) as part of a BSR. In this way, the sidelink transmitting UE may expand message fields in a BSR to include subchannel information indication without having to transmit a separate transmission (with an additional LBT) to indicate the subchannel information. FIGS. 4-8 illustrate various mechanisms for indicating subchannel information via a BSR.

Figure 4:
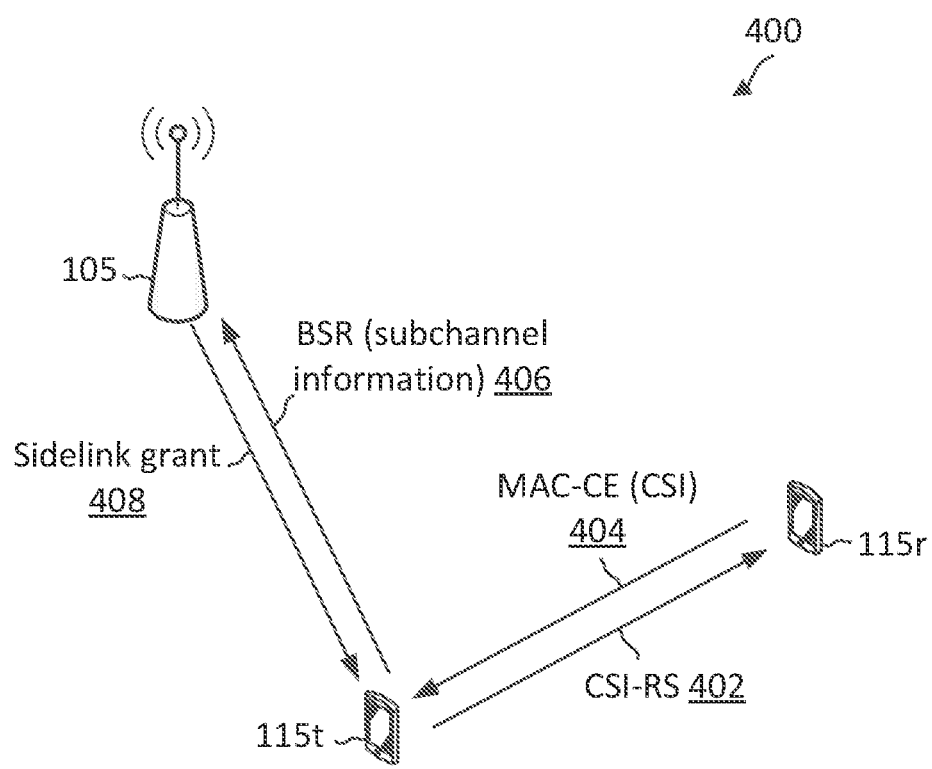
FIG. 4 illustrates a sidelink communication scenario with subchannel selection recommendation and/or channel state information (CSI) indication via buffer status reporting according to some aspects of the present disclosure.

FIG. 4 illustrates a sidelink communication scenario 400 with subchannel selection recommendation and/or CSI via buffer status reporting according to some aspects of the present disclosure. The scenario 400 may correspond to a sidelink communication scenario in the network 100. The scenario may be substantially similar to the scenarios 300, 310, and 320, where a BS 105 may allocate sidelink resource(s) for a sidelink transmitting UE 115*t* to transmit data to a sidelink receiving UE 115*r*. However, in the scenario 400, the sidelink transmitting UE 115*t* may transmit a BSR including sidelink subchannel information to the BS 105 so that the BS 105 may select sidelink resource(s) in subchannels that are suitable (e.g., with a high signal-to-noise ratio (SNR) and/or a high signal-to-interference-plus-noise ratio (SINR)) for the sidelink transmitting UE 115 to communicate with the sidelink receiving UE 115*r*.

As shown, at action 402, the sidelink transmitting UE 115*t* transmits a CSI-RS to the sidelink receiving UE 115*r*. Upon receiving the CSI-RS, the sidelink receiving UE 115*r* may determine rank information and/or a channel quality (e.g., a layer 1-reference signal received power (L1-RSRP)) based on the received CSI-RS. For instance, the sidelink transmitting UE 115*t* and the sidelink receiving UE 115*r* may communicate with each other over a wideband BWP (e.g., with a bandwidth of 100 MHz). In some instances, the wideband BWP may be in an unlicensed frequency band. The wideband BWP may be divided into a plurality of subchannels (each including a number of consecutive subcarriers 204), and sidelink may be communicated in units of subchannels. In other words, each sidelink transmission may use a resource within a subchannel. Accordingly, in some instances, the sidelink transmitting UE 115*t* may transmit a CSI-RS in each subchannel, and the sidelink receiving UE 115*r* may determine channel measurements (e.g., a channel estimate and/or a L1-RSRP) for each CSI-RS received in each subchannel.

At action 404, the sidelink receiving UE 115*r* transmits a CSI report to the sidelink transmitting UE 115*t*. In some instances, the CSI report may include a 1-bit RI and/or a 4-bit CQI for each subchannel. The RI may indicate a bit value of 0 for a first transmission rank and a bit value of 1 for a second transmission rank (e.g., determined from the channel estimate). The CQI may indicate a quantized value representing the L1-RSRP. In some instances, the sidelink receiving UE 115*r* may transmit the CSI report in the form of a MAC-CE over a PSSCH.

In some aspects, the sidelink transmitting UE 115*t* may have data buffered at the sidelink transmitting UE 115*t* (e.g., at a memory such as the memory 1004) awaiting for transmission to the sidelink receiving UE 115*r*. Since sidelink resources are allocated by the BS 105, the sidelink transmitting UE 115*t* transmits a BSR to the BS 105 as shown at action 406 to request for sidelink resources. The BSR may include information, such as a destination ID identifying the sidelink receiving UE 115*r*, a LCG ID identifying a LCG associated with the buffered data, and a buffer size indicating a data size (e.g., a number of bytes) of the buffered data. Additionally, the sidelink transmitting UE 115*t* may include subchannel information associated with one or more subchannels between the sidelink transmitting UE 115*t* and the sidelink receiving UE 115*r* where the sidelink transmitting UE 115*t* may transmit the data. The sidelink transmitting UE 115 may generate the subchannel information based on the CSI report received from the sidelink receiving UE 115*r* at action 404. The subchannel information can assist the BS 105 in selecting most suitable subchannels (with good SNR and/or SINR) for the sidelink transmitting UE 115*t*. In some aspects, the sidelink transmitting UE 115*t* may determine the best subchannel from the frequency selective subchannels based on a CSI report history. For instance, the sidelink transmitting UE 115*t* may transmit multiple CSI-RSs to the sidelink receiving UE 115*r* over a period of time, and may receive multiple CSI reports from the sidelink receiving UE 115*r* over the period. The sidelink transmitting UE 115*t* may select the best channel based on the history of received CSI reports, for example, based on an average channel measure over the measurements in the CSI reports.

In one aspect, the sidelink transmitting UE 115 may determine which of the subchannel(s) are suitable for communicating with the sidelink receiving UE 115*r* based on the received CSI report. In this regard, the sidelink transmitting UE 115 may select a best subchannel or one or more subchannels that have received signal measurements (e.g., L1-RSRP) higher than other subchannels in the plurality of subchannels. The sidelink transmitting UE 115 may indicate the selected subchannels as preferred or recommended subchannels in the BSR. In some aspects, the sidelink transmitting UE 115*t* may indicate a list of preferred subchannels in the BSR, for example, by adding an additional message field to the BSR. The message field may have a bit-length that is proportional to the length of the preferred subchannel list. For instance, the number of plurality of subchannels is 5, and thus each subchannel may be indicated with three bits. If there are 3 preferred subchannels in the list, then the message field may be nine bits long. In some aspects, the sidelink transmitting UE 115*t* may indicate the list of preferred subchannels sorted in an order of preference, for example, in an increasing order of preferences or in a decreasing order of preferences. In some aspects, the sidelink transmitting UE 115*t* may indicate the list of preferred subchannels by indicating a joint indication (e.g., a codeword) of a starting subchannels and a number of consecutive subchannels beginning from the starting subchannel recommended for transmitting to the sidelink receiving UE 115*r* as will be discussed more fully below with respect to FIG. 5. In some aspects, the sidelink transmitting UE 115*t* may indicate the list of preferred subchannels and a number of subchannels in the list of preferred subchannels recommended for transmitting to the sidelink receiving UE 115*r* as will be discussed more fully below with respect to FIG. 6.

In another aspect, the sidelink transmitting UE 115*t* may include, in the BSR, CSI received from the sidelink receiving UE 115*r* as will be discussed more fully below with respect to FIG. 7. In some instances, the sidelink transmitting UE 115*t* may include CSI for subchannels that satisfy certain threshold(s) (e.g., a threshold RSRP) in the BSR. In some other instances, the sidelink transmitting UE 115*t* may include CSI for all subchannels in the BSR. In some instances, the sidelink transmitting UE 115*t* may transmit multiple CSI-RSs to the sidelink receiving UE 115*r* over a period of time (either periodically or aperiodically), and thus may receive multiple CSI reports from the sidelink receiving UE 115*r*. When the sidelink transmitting UE 115*t* has received multiple CSI reports from the sidelink receiving UE 115*r*, the sidelink transmitting UE 115 may include CSI from a most recently received CSI report in the BSR.

At action 408, the BS 105 transmits a sidelink grant to the sidelink transmitting UE 115*t*. The sidelink grant may be in a DCI 3_0 format and may be transmitted via a PDCCH over the uU interface between the sidelink transmitting UE 115*t* and the BS 105. For instance, the BS 105 may receive the BSR from the sidelink transmitting UE 115*t* at action 406, and may determine the sidelink grant based on the BSR. In this regard, the BS 105 may select one or more subchannel(s) from the plurality of subchannels based on the subchannel information and allocate a resource (a time-frequency resource) from the subchannel and in a certain slot (e.g., the slot 202) for the sidelink transmitting UE 115*t*. The BS 105 may determine a size of the resource based on the buffer size indicated by the BSR. As explained above, the BS 105 may allocate up to two resources (e.g., a first resource for an initial transmission and a second resource for a retransmission) for the sidelink transmitting UE 115*t*. The BS 105 may also determine transmission parameters (e.g., MCS) based on the subchannel information. Thus, the sidelink grant may include an indication of the selected resource(s) and/or transmission parameters. Accordingly, upon receiving the sidelink grant at the sidelink transmitting UE 115*t*, the sidelink transmitting UE 115 may transmit the data to the sidelink receiving UE 115*r* using the resource(s) indicated by the sidelink transmission grant. For instance, the sidelink transmitting UE 115*t* may transmit a data packet to the sidelink receiving UE 115*r* using the first resource and may retransmit the data packet to the sidelink receiving UE 115*r* using the second resource upon receiving a NACK (for the data packet) from the sidelink receiving UE 115*r*.

While FIG. 4 illustrates the sidelink transmitting UE 115*t* in communication with one sidelink UE 115*r*, the sidelink transmitting UE 115*t* may communicate with multiple sidelink UEs 115 and may have data for multiple target sidelink receiving UEs 115*r* Channel conditions between the sidelink transmitting UE 115*t* and each of the target sidelink receiving UEs may vary. As such, the sidelink transmitting UE 115*t* can include buffer statuses along with subchannel information for each of the target sidelink receiving UEs 115*r*. The BS 105 may in turn allocate one or more sidelink resources for the sidelink transmitting UE 115*t* to transmit to each of the one or more sidelink receiving UEs 115*r*. In some aspects, the BS 105 may serve multiple sidelink transmitting UEs 115*t* and may receive a BSR from each sidelink transmitting UE 115. The BS 105 may allocate sidelink resource(s) for each sidelink transmitting UE 115*t*, for example, based on a corresponding BSR. The BS 105 may allocate sidelink resources for the multiple sidelink transmitting UEs 115*t* in a FDM manner. The subchannel information reported by each sidelink transmitting UE 115*t* may assist the BS 105 in resolving potential collisions among transmissions of the sidelink transmitting UEs. For instance, the BS 105 may allocate different subchannels (different frequency resources) to different sidelink transmitting UEs 115*t*. In some instances, the BS 105 may perform a tradeoff between selecting a subchannel from the list of preferred subchannels recommended by a sidelink transmitting UE and avoiding a collision among the sidelink transmitting UEs 115*t*. For example, a first sidelink transmitting UE 115*t* may indicate a first preferred subchannel and a second preferred subchannel in a decreasing order of preference, and a second sidelink transmitting UE 115 may indicate a third preferred subchannel and a fourth preferred subchannel in a decreasing order of preference. The first preferred subchannel may correspond to the third preferred subchannel, and the second subchannel may be different from the fourth subchannel. To avoid a collision, the BS 105 may allocate a frequency resource in the first preferred subchannel (most preferred) for the first sidelink transmitting UE 115*t*, and may allocate a frequency resource in the fourth subchannel (less preferred) for the second sidelink transmitting UE 115*t*.

Figure 5:
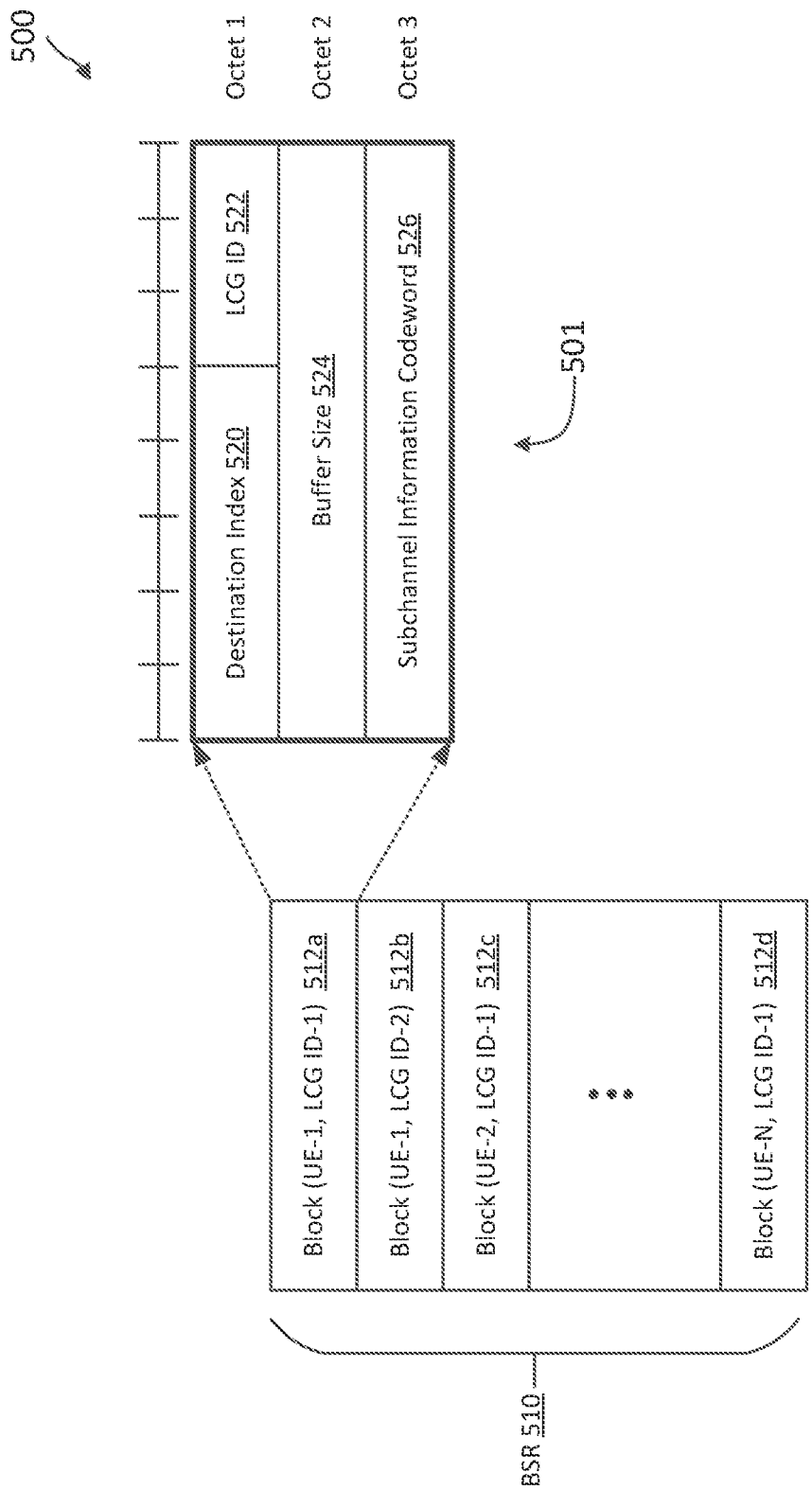
FIG. 5 illustrates a message structure for an enhanced buffer status report (BSR) with sidelink subchannel information according to some aspects of the present disclosure.

FIG. 5 illustrates a message structure 500 for an enhanced BSR 510 with sidelink subchannel information according to some aspects of the present disclosure. The BSR 510 may be employed by a sidelink UE 115 to report BSR to a BS 105 when performing sidelink in mode-1 RRA. For instance, in the scenario 400, the sidelink transmitting UE 115*t* may transmit the BSR (e.g., carried in a MAC-CE) to the BS 105 at action 406 by utilizing the message structure 500.

As shown, the BSR 510 includes a plurality of entries or blocks 512 (shown as 512*a*, 512*b*, 512*c*, . . . , 512*d*). Each block 512 may include buffer information and sidelink subchannel information associated with a target sidelink receiving UE 115*r* and a LCG of the respective target sidelink receiving UE 115*r*. For instance, the block 512*a* may be associated with a first sidelink receiving UE 115*r*, denoted as UE-1, and a LCG identified by LCG ID-1 associated with UE-1. The block 512*b* may also be associated with the first sidelink receiving UE, UE-1, but for a different LCG identified by LCG ID-2 associated with UE-1. The block 512*c* may be associated with a second sidelink receiving UE 115*r*, denoted as UE-2, and a LCG identified by LCG ID-1 at UE-2. The block 512*d* may be associated with an $N^{th}$ sidelink receiving UE 115*r*, denoted as UE-N, and a LCG identified by LCG ID-1 associated with UE-N.

As shown by the expanded view 501, each block 512 includes a destination index field 520, a LCG ID field 522, a buffer size field 524, and subchannel information codeword field 526 in three octets (8 bits). The destination index field 520 and the LCG ID field 522 may be referred to as a sub-header field and may occupy one octet. For instance, the destination index field 520 may be 5 bits long and the LCG ID field 522 may be 3 bits long. The buffer size field 524 may be one octet long. The subchannel information codeword field 526 may also be one octet long. As such, the BSR 510 may have a length of K×3 octets, where K is the number of blocks 512 in the BSR 510.

The destination index field 520 may indicate a destination index identifying a sidelink receiving UE 115*r*. The LCG ID field 522 may indicate a LCG ID identifying a LCG whose sidelink buffer status is being reported in the buffer size field 524. The buffer size field 524 may indicate a total amount of data (e.g., number of bytes) available for all logical channels within the indicated LCG. The subchannel information codeword field 526 may be a joint indication (a codeword) of a preferred starting subchannel (a subchannel index) and a number of subchannels (beginning at the preferred starting subchannel). The number of subchannels may be for the total amount of bytes in all LCGs with data ready for transmission to the sidelink receiving UE 115*r*. Based on the BS 105 scheduling decision on LCG multiplexing, the number of subchannels allocated by the BS 105 can be less than the number of subchannels indicated by the codeword. In some aspects, for L number of subchannels, the jointly encoded preferred starting subchannel and number of subchannels may be represented by K number of bits, where K=ceil ($\log_2$ ((L+1)×L/2)). For instance, if L is 5, K will be 4.

With 8 bits for the subchannel information codeword field 526, the subchannel information codeword field 526 can indicate up to 22 subchannels. If there are more than 22 subchannels, the sidelink transmitting UE 115 can indicate the closest subchannel in a subsampled subchannel set. For instance, if there are 44 subchannels, the set of 44 subchannels can be subsampled by 2, and the indication may indicate a subchannel in the set of subsampled subchannels (e.g., even indexed subchannels or odd indexed subchannels). In some aspects, the set of subsampled subchannels or the subsampling factor can be configured by BS 105 via an RRC configuration. For instance, the BS 105 may transmit, to the sidelink transmitting UE **115*t***, an RRC configuration indicating a subchannel subsampling configuration (e.g., a subsampling factor and/or a starting subchannel index for the set of subsampled subchannels).

As an example, in the block **512*a*, the destination index field 520 may indicate a destination index identifying UE-1, the LCG ID field 522 may indicate a LCG ID-1 identifying a first LCG at UE-1, the buffer size field 524 may indicate a total amount of data bytes for the first LCG, and the subchannel information codeword field 526 may indicate a joint indication (a first codeword) of a preferred starting subchannel and a number of subchannels for transmitting data to the UE-1. Similarly, in the block 512*b*, the destination index field 520 may indicate a destination index identifying UE-1, the LCG ID field 522 may indicate a LCG ID-2 identifying a second LCG (different from the first LCG) at UE-1, the buffer size field 524 may indicate a total amount of data bytes for the second LCG, and the subchannel information codeword field 526 may indicate a joint indication (a second codeword) of a preferred starting subchannel and a number of contiguous subchannels for transmitting data to the UE-1. The second codeword can be the same as the first codeword or different from the first codeword. Similarly, in the block 512*c*, the destination index field 520 may indicate a destination index identifying UE-2, the LCG ID field 522 may indicate a LCG ID-1 identifying a first LCG at UE-2, the buffer size field 524 may indicate a total amount of data bytes for the first LCG, and the subchannel information codeword field 526 may indicate a joint indication (a third codeword) of a preferred starting subchannel and a number of subchannels for transmitting data to the UE-2. The indication of the buffer size along with the number of subchannels effectively indicate the spectral efficiency of the subchannels between the sidelink transmitting UE 115*t* and a corresponding sidelink receiving UE 115*r***.

When the BS 105 receives the BSR 510, the BS 105 may determine one or more sidelink transmission grants for the sidelink transmitting UE **115*t* to transmit data to each corresponding sidelink receiving UE 115*r* indicated by the destination index field 520 in the blocks 512. In this regard, the BS 105 may select one or more subchannels for the sidelink transmitting UE 115*t* to transmit to a sidelink receiving UE 115*r* based on corresponding preferred subchannels indicated by the subchannel information codeword field(s) 526. The BS 105 may select a sidelink resource (e.g., a time-frequency resource including one or more symbols in time and one or more subcarriers in frequency) based on the selected subchannel(s). In an example, the sidelink transmitting UE 115*t* may indicate 2 subchannels starting from subchannel index 3 in the subchannel information for LCG ID-1 of UE-1 and LCG ID-2 of UE-2. Accordingly, the BS 105 may allocate a first resource in a first subchannel identified by subchannel index 3 and a second resource in a second subchannel identified by subchannel index 4. The first resource may be used by the sidelink transmitting UE 115*t* to transmit data of LCG ID-1 to the UE-1. The second resource may be used by the sidelink transmitting UE 115*t* to transmit data of LCG ID-2 to the UE-2. Additionally, the BS 105 may allocate a third resource, for example, in the second subchannel for the sidelink transmitting UE 115*t* to retransmit the data of LCG ID-1 to the UE-1 if the sidelink transmitting UE 115*t*** fails to receive an ACK for the data of LCG ID-1 transmitted in the first resource.

When there are many preferred subchannels in the list of preferred subchannels and the preferred subchannels share similar spectral efficiency, joint encoding of the subchannel index and the number of subchannels for each LCG ID as in the BSR 510 can have a large overhead. Instead, the sidelink transmitting UE **115*t* may indicate a number of subchannels once for each destination sidelink receiving UE as shown in FIG. 6**.

Figure 6:
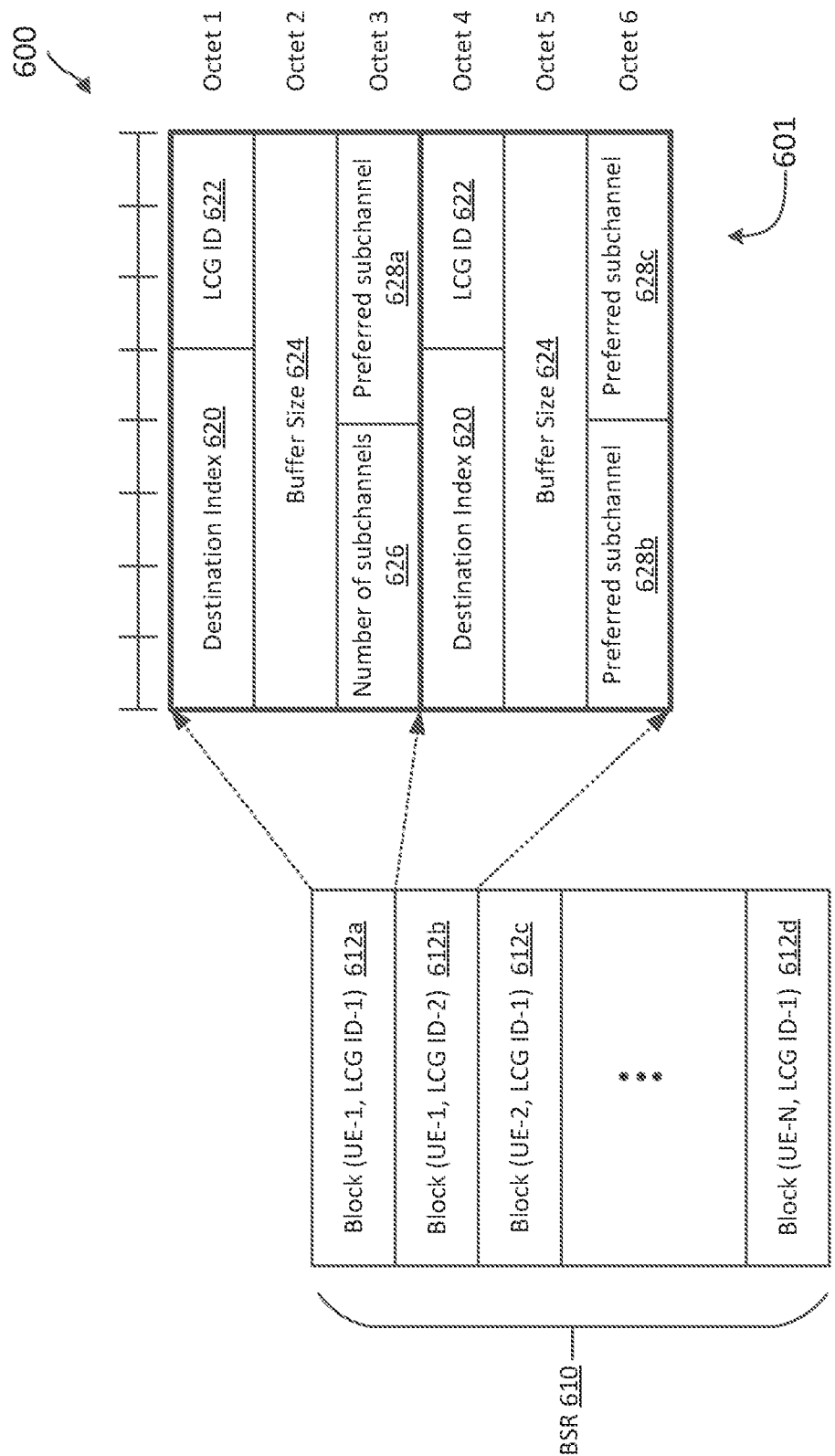
FIG. 6 illustrates a message structure for an enhanced BSR with sidelink subchannel information according to some aspects of the present disclosure.

FIG. 6 illustrates a message structure 600 for an enhanced BSR 610 with sidelink subchannel information according to some aspects of the present disclosure. The BSR 610 may be employed by a sidelink UE 115 to report BSR to a BS 105 when performing sidelink in mode-1 RRA. For instance, in the scenario 400, the sidelink transmitting UE **115*t* may transmit the BSR (e.g., carried in a MAC-CE) to the BS 105 at action 406 by utilizing the message structure 600. The BSR 610 may be substantially similar to the BSR 510 of FIG. 5, but may indicate preferred subchannels for sidelink by indicating a common number of subchannels followed by a list of preferred subchannels per destination UE instead of a joint indication or codeword for each LCG ID as in the message structure 500**. The indicated common number of subchannels is a maximum number of recommended (or required) subchannels among the list of preferred subchannels for communicating (data buffered for all LCGs) with a respective destination UE.

As shown, the BSR 610 includes a plurality of entries or blocks 612 (shown as **612*a*, 612*b*, 612*c*, . . . , 612*d*). Each block 612 may include buffer information and sidelink subchannel information associated with a target sidelink receiving UE 115 and a LCG of the respective target sidelink receiving UE 115. For instance, the block 612*a* may be associated with a first sidelink receiving UE 115*r*, denoted as UE-1, and a LCG identified by LCG ID-1 associated with UE-1. The block 612*b* may also be associated with the first sidelink receiving UE, UE-1, but for a different LCG identified by LCG ID-2 associated with UE-1. The block 612*c* may be associated with a second sidelink receiving UE 115*r*, denoted as UE-2, and a LCG identified by LCG ID-1 associated with UE-2. The block 612*d* may be associated with an $N^{th}$ sidelink receiving UE 115*r***, denoted as UE-N, and a LCG identified by LCG ID-1 associated with UE-N.

As shown by the expanded view 601, each block 612 includes a destination index field 620, a LCG ID field 522, a buffer size field 624. The destination index field 620, the LCG ID field 622, and the buffer size field 624 are similar to the destination index field 520, the LCG ID field 522, and the buffer size field 524, respectively. A first block 612 (e.g., the block **612*a*) associated with the destination may further include a number of subchannels field 626 and a preferred subchannel field 628 (shown as 628*a***) occupying one octet.

A subsequent block 612 (e.g., the block 612b) associated with the same destination may not include a number of subchannels field 626, but may instead include multiple preferred subchannel field 628 (shown as 628b and 628c). Each preferred subchannel field 628 may be about 4 bits long and may indicate a preferred subchannel (e.g., represented by a subchannel index). The number of subchannels field 626 may be about 4 bits long and may indicate a maximum number of recommended or preferred subchannels in the list of preferred subchannels for transmitting data (queued at the sidelink transmitting UE 115t's memory) for all LCGs with the destination UE. Thus, the sidelink transmitting UE 115t may include a single number of subchannels field 626 in the BSR 610 for each sidelink receiving UE 115r, and may include multiple blocks 612 with multiple preferred subchannel fields 628 for one sidelink receiving UE 115r. Similar to the BSR 510, the BSR 610 may have a length of K×3 octets, where K is the number of blocks 612 in the BSR 610.

In the example illustrated in FIG. 6, the sidelink transmitting UE 115t may indicate a list of three preferred subchannels for communicating with a sidelink receiving UE 115r (UE-1) by utilizing two blocks 612, a first block 612a and a second block 612b. The block 612a is for UE-1 and LCG ID-1, and the block 612b is for UE-1 and LCG ID-2. The sidelink transmitting UE 115t may determine a list of three preferred subchannels for communicating with the sidelink receiving UE 115r (UE-1). As such, the number of subchannels field 626 may indicate value of 3, the preferred subchannel field 628a may indicate a first preferred subchannel, the preferred subchannel field 628b may indicate a second preferred subchannel, and the preferred subchannel field 628c may indicate a third preferred subchannel. In some other examples, the sidelink transmitting UE 115t may have a list of 3 preferred subchannels for UE-1 LCG ID-1, and thus may again utilize two blocks 612 and may indicate the same LCG ID in both blocks 612. In other words, the sidelink transmitting UE 115t may repeat a block 612 with the same destination ID and LCG IDs and add additional preferred subchannel(s) if there are more preferred subchannels in the list of preferred subchannels.

In general, the sidelink transmitting UE 115t may indicate multiple preferred subchannels by appending blocks 612 for different LCG IDs if there are different LCG IDs available. Otherwise, the sidelink transmitting UE 115t may repeat a block 612 with the same destination index and the same LCG ID in a next block 612 with additional preferred subchannels. Thus, the BSR 610 can include a first block 612 and a second block 612 associated with a certain sidelink receiving UE 115r. The first block 612 may indicate a destination index, a first LCG ID, a buffer size, and first subchannel information (e.g., a number of subchannels in a list of preferred subchannels and a first preferred subchannel in the list) associated with a first sidelink receiving UE 115r. The second block 612 may indicate the same destination index, the same first LCG ID or a second, different, LCG ID, the buffer size, and second subchannel information (e.g., a second preferred subchannel and a third preferred subchannel in the list) associated with the first sidelink receiving UE. Alternatively, the BSR 610 can include a first block 612 associated with a first sidelink receiving UE 115r (UE-1) and a second block 612 associated with a second sidelink receiving UE 115r (UE-2). The first block 612 may indicate a destination index, a LCG ID, a buffer size, and first subchannel information (e.g., a number of subchannels in a list of preferred subchannels and a first preferred subchannel in the list) associated with the UE-1. The second block 612 may indicate a destination index, a LCG ID, a buffer size, and second subchannel information (e.g., a second preferred subchannel and a third preferred subchannel in the list) associated with UE-2. While FIG. 6 illustrates the preferred subchannel field 628 with a size of 4 bits, in some aspects, the size of the preferred subchannel field 628 can be configured by the BS 105 via an RRC configuration. For instance, the BS 105 may transmit, to the sidelink transmitting UE 115t, an RRC configuration indicating a message field size for the preferred subchannel field 628.

When the BS 105 receives the BSR 610, the BS 105 may determine one or more sidelink transmission grants for the sidelink transmitting UE 115t to transmit data to each corresponding sidelink receiving UE 115r indicated by the destination index field 620 in the blocks 612. In this regard, the BS 105 may select one or more subchannels for the sidelink transmitting UE 115t to transmit to a sidelink receiving UE 115r based on corresponding preferred subchannels indicated by the number of subchannels field 626 and the preferred subchannel field(s) 628. The BS 105 may select a sidelink resource (e.g., a time-frequency resource including one or more symbols in time and one or more subcarriers in frequency) based on the selected subchannel(s). In an example, the block 612a may indicate a number of subchannels is 3 a first preferred subchannel for the UE-1. The block 612b may indicate a second preferred subchannel and a third preferred subchannel. Accordingly, the BS 105 may allocate a first resource in the first preferred subchannel and a second resource in the second preferred subchannel. The first resource may be used by the sidelink transmitting UE 115t to transmit data of LCG ID-1 to the UE-1. The second resource may be used by the sidelink transmitting UE 115t to transmit data of LCG ID-2 to the UE-2. Additionally, the BS 105 may allocate a third resource, for example, in the second preferred subchannel for the sidelink transmitting UE 115t to retransmit the data of LCG ID-1 to the UE-1 if the sidelink transmitting UE 115t fails to receive an ACK for the data of LCG ID-1 transmitted in the first resource.

Figure 7:
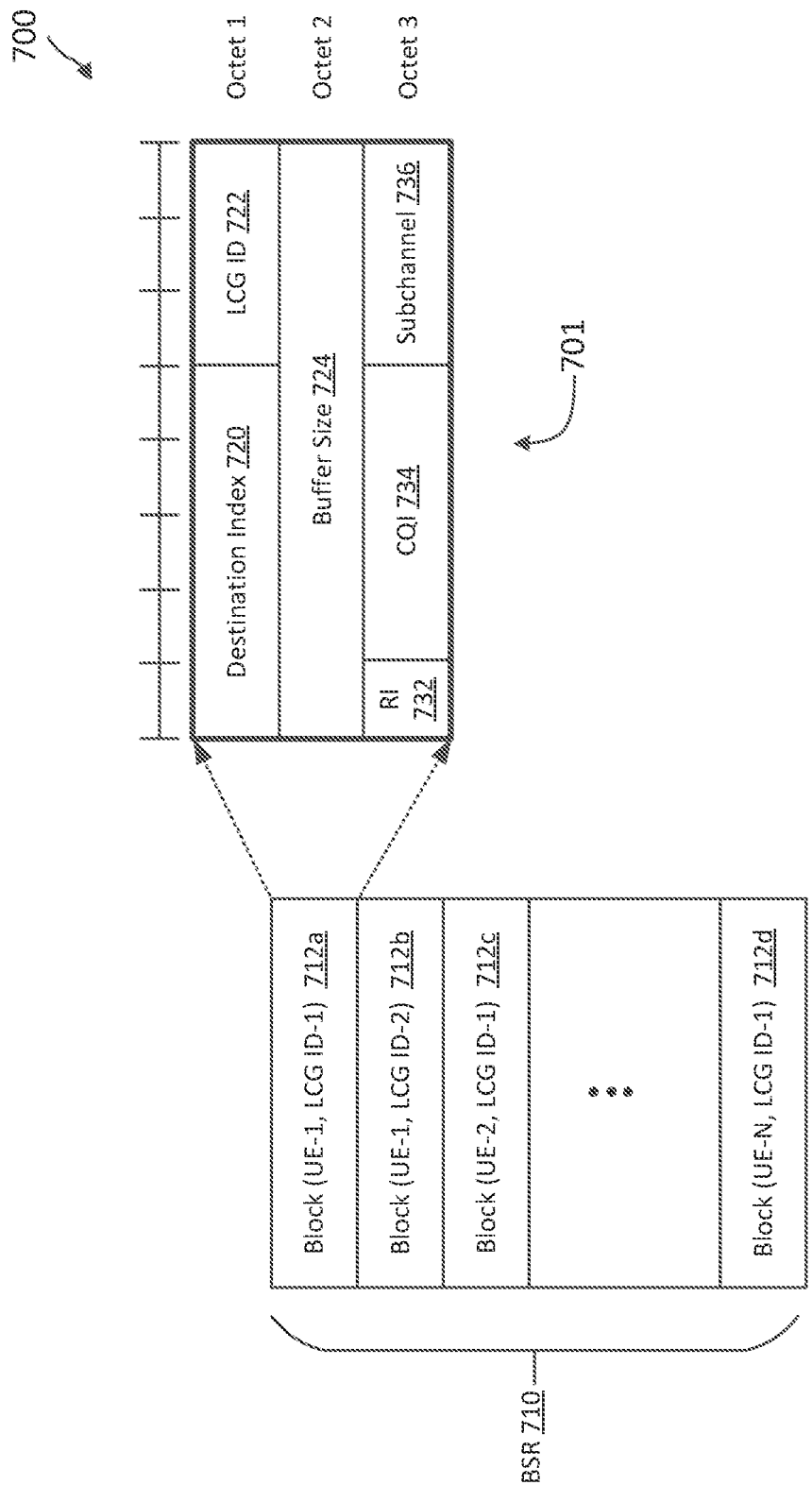
FIG. 7 illustrates a message structure for an enhanced BSR with sidelink subchannel information according to some aspects of the present disclosure.

FIG. 7 illustrates a message structure 700 for an enhanced BSR 710 with sidelink subchannel information according to some aspects of the present disclosure. The BSR 710 may be employed by a sidelink UE 115 to report BSR to a BS 105 when performing sidelink in mode-1 RRA. For instance, in the scenario 400, the sidelink transmitting UE 115t may transmit the BSR (e.g., carried in a MAC-CE) to the BS 105 at action 406 by utilizing the message structure 700. The BSR 710 may indicate subchannel information for sidelink by indicating CSI (including RI and/or CQI) associated with sidelink subchannel(s) between a sidelink transmitting UE 115t and each respective destination sidelink receiving UE 115r.

As shown, the BSR 710 includes a plurality of entries or blocks 712 (shown as 712a, 712b, 712c, . . . , 712d). Each block 712 may include buffer information and sidelink subchannel information associated with a target sidelink receiving UE 115r and a LCG of the respective target sidelink receiving UE 115r. For instance, the block 712a may be associated with a first sidelink receiving UE 115r, denoted as UE-1, and a LCG identified by LCG ID-1 associated with UE-1. The block 712b may also be associated with the first sidelink receiving UE 115r, UE-1, but may be for a different LCG identified by LCG ID-2 associated with UE-1. The block 712c may be associated with a second sidelink receiving UE 115r, denoted as UE-2, and a LCG identified by LCG ID-1 associated with UE-2. The block 712d may be associated with an $N^{th}$ sidelink receiving UE 115r, denoted as UE-N, and a LCG identified by LCG ID-1 associated with UE-N.

As shown by the expanded view 701, each block 712 includes a destination index field 720, a LCG ID field 722, a buffer size field 724, a RI field 732, a CQI field 734, and a subchannel field 736. The destination index field 720 is similar to the destination index field 520 and 620 (identifying a sidelink receiving UE 115r). The LCG ID field 722 is similar to the LCG ID fields 522 and 622 (identifying a LCG at the sidelink receiving UE 115r). The buffer size field 724 is similar to buffer size fields 524 and 624 (indicating an amount of data for the respective LCG). The RI field 732, the CQI field 734, and the subchannel field 736 may occupy one octet. For instance, the RI field may be 1 bit long, the CQI field 734 may be 4 bits long, and the subchannel field 736 may be 3 bits long. As such, the BSR 710 may have a length of K×3 octets, where K is the number of blocks 712 in the BSR 710.

The subchannel field 736 may indicate a subchannel index identifying a subchannel between the sidelink transmitting UE 115t and a respective sidelink receiving UE 115r. The RI field 732 may indicate a preferred RI (a preferred transmission rank or number of spatial layers) for a sidelink transmission from the sidelink transmitting UE 115t to the respective sidelink receiving UE 115r in the subchannel. For instance, the RI may indicate a bit value of 0 for a first transmission rank and a bit value of 1 for a second transmission rank. The CQI field 734 may indicate a channel quality (e.g., a quantized L1-RSRP) for the subchannel. The 3 bits subchannel field 736 can support up to 8 subchannels. If there are more than 8 subchannels between the sidelink transmitting UE 115t and the sidelink receiving UE 115r, the sidelink transmitting UE 115 can indicate the closest subchannel in a subsampled subchannel set. For instance, if there are 16 subchannels, the set of 16 subchannels can be subsampled by 2 (into 8 subchannels), and the indication may indicate a subchannel in the set of 8 subsampled subchannels (e.g., even indexed subchannels or odd indexed subchannels). In some aspects, the set of subsampled subchannels or the subsampling factor can be configured by BS 105 via an RRC configuration. For instance, the BS 105 may transmit, to the sidelink transmitting UE 115t, an RRC configuration indicating a subchannel subsampling configuration (e.g., a subsampling factor and/or a starting subchannel index for the set of subsampled subchannels). In some aspects, the sidelink transmitting UE 115t may obtain the RI and/or the CQI from a respective sidelink receiving UE 115r identified by the destination index. For instance, the sidelink transmitting UE 115t transmits a CSI-RS (a predetermined waveform) to the sidelink receiving UE 115r over the sidelink channel. The sidelink receiving UE 115r may determine a channel estimate based on the received CSI-RS and the predetermined CSI-RS waveform and may determine rank information (e.g., a RI representing a transmission rank) from the channel estimate. The sidelink receiving UE 115t may also determine received signal measurement (e.g., a layer 1-reference signal received power (L1-RSRP)) for the received CSI-RS and may determine the channel quality (e.g., a CQI) based on the received signal measurement (e.g., by quantizing the L1-RSRP based on a number of CQI levels). The sidelink receiving UE 115r may transmit a CSI report indicating a RI and a CQI to the sidelink transmitting UE 115t.

In some aspects, the sidelink transmitting UE 115t may sound each subchannel by transmitting a CSI-RS in each subchannel, and the sidelink receiving UE 115r may report CSI (e.g., RI and/or CQI) for each subchannel to the sidelink transmitting UE 115t. The sidelink transmitting UE 115t may indicate the RI and CQI for each subchannel based on a respective CSI report received from the sidelink receiving UE 115r. In some instances, the sidelink transmitting UE 115t may include CSI for each subchannel in the BSR 710. In some other instances, the sidelink transmitting UE 115t may include CSI for a subset of the subchannels in the BSR 710. In general, the BSR 710 may include multiple blocks 712 for the same destination sidelink receiving UE 115r when there are multiple subchannels CSI to be included.

In some instances, the sidelink transmitting UE 115t may transmit multiple CSI-RSs in a given subchannel to the sidelink receiving UE 115r over a period of time (either periodically or aperiodically), and may receive multiple CSI reports from the sidelink receiving UE 115r. When the sidelink transmitting UE 115t has received multiple CSI reports from the sidelink receiving UE 115r, the sidelink transmitting UE 115 may include CSI (e.g., RI and/or CQI) for the given subchannel from a most recently received CSI report in the BSR 710.

When the BS 105 receives the BSR 710, the BS 105 may determine one or more sidelink transmission grants for the sidelink transmitting UE 115t to transmit data to each corresponding sidelink receiving UE 115r indicated by the destination index field 720 in the blocks 712. In this regard, the BS 105 may select one or more subchannels for the sidelink transmitting UE 115t to transmit to a sidelink receiving UE 115r based on corresponding preferred subchannels indicated by the RI field 732, the CQI field 734, and the subchannel field 736. The BS 105 may select a sidelink resource (e.g., a time-frequency resource including one or more symbols in time and one or more subcarriers in frequency) based on the selected subchannel. In some instances, the BS 105 may allocate a first resource in one of the selected subchannels for the sidelink transmitting UE 115t to transmit an initial transmission and a second resource in one of the selected subchannels for the sidelink transmitting UE 115t to transmit a HARQ retransmission.

Figure 8:
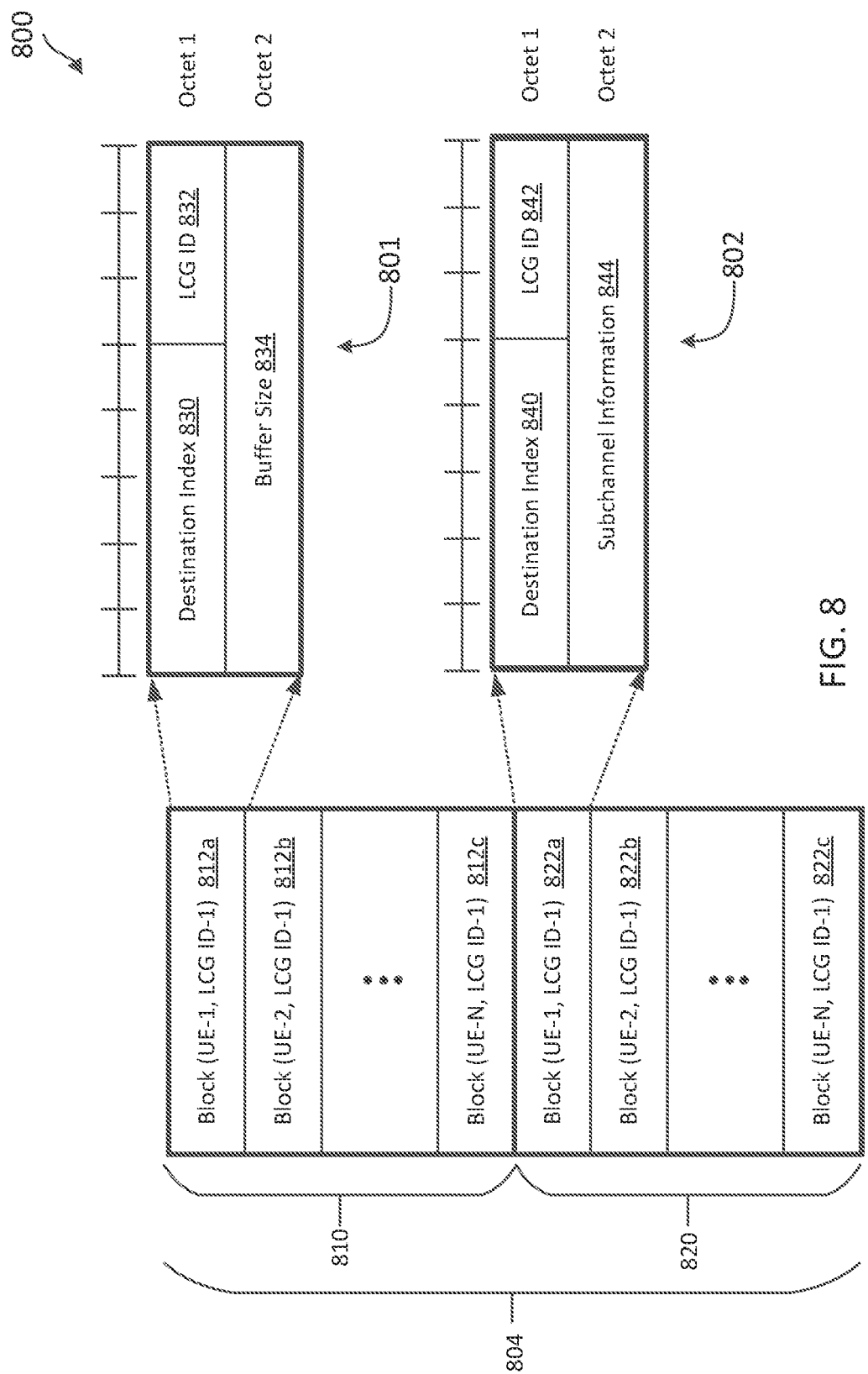
FIG. 8 illustrates a message structure for an enhanced BSR with sidelink subchannel information according to some aspects of the present disclosure.

FIG. 8 illustrates a message structure 800 for an enhanced BSR 804 with sidelink subchannel information according to some aspects of the present disclosure. The BSR 804 may be employed by a sidelink UE 115 to report BSR to a BS 105 when performing sidelink in mode-1 RRA. For instance, in the scenario 400, the sidelink transmitting UE 115t may transmit a BSR (e.g., carried in a MAC-CE or a bundled MAC-CE) to the BS 105 at action 406 by utilizing the message structure 800. The BSR 804 may be substantially similar to the BSR 510 of FIG. 5, the BSR 610 of FIG. 6, and the BSR 710 of FIG. 7, but may group buffer status information for one or more destination sidelink UEs into one block and group sidelink subchannel information for the one or more destination sidelink UEs into another block.

In FIG. 8, the BSR 804 includes a first group block 810 carrying buffer status information for a plurality of target sidelink receiving UEs and a second group block 820 carrying sidelink subchannel information for the plurality of target sidelink receiving UEs. The first group block 810 includes a plurality of entries or blocks 812 (shown as 812a, 812b, . . . , 812c). Each block 812 may include buffer information associated with a target sidelink receiving UE 115 and a LCG associated with the respective target sidelink receiving UE 115. For instance, the block 812a may be associated with a first sidelink receiving UE 115r, denoted as UE-1, and a LCG identified by LCG ID-1 associated with UE-1. The block 812b may be associated with a second sidelink receiving UE 115r, denoted as UE-2 and a LCG identified by LCG ID-2 associated with UE-2. The block 812c may be associated with an $N^{th}$ sidelink receiving UE 115r, denoted as UE-N, and a LCG identified by LCG ID-1 associated with UE-N.

As shown by the expanded view 801, each block 812 includes a destination index field 830, a LCG ID field 832, and a buffer size field 834. The destination index field 830 is similar to the destination index field 520, 620, and 720 (identifying a sidelink receiving UE 115r). The LCG ID field 832 is similar to the LCG ID fields 522, 622, and 722 (identifying a LCG at the respective sidelink receiving UE 115r). The buffer size field 834 is similar to the buffer size fields 524, 624, and 724 and 624 (indicating an amount of data for the respective LCG). In some instances, the destination index field 830, the LCG ID field 832, and the buffer size field 834 together occupies two octets. As such, the first group block 810 may have a length of K1×2 octets, where K1 is the number of blocks 812 in the first group block 810.

The second group block 820 includes a plurality of entries or blocks 822 (shown as 822a, 822b, 822c). Each block 822 may include sidelink subchannel information associated with a target sidelink receiving UE 115 and at least one of a destination index or an associated LCG identified in the first group block 810, for example, arranged in a similar order as the block 812 in the first group block 810. For instance, the block 822a may be associated with the first sidelink receiving UE 115r, UE-1 (identified by the block 812a), and the same LCG ID-1 (identified by the block 812a). The block 822b may be associated with the second sidelink receiving UE 115r, UE-2 (identified by the block 812b), and the same LCG ID-2 (identified by the block 812b). The block 822c may be associated with the $N^{th}$ sidelink receiving UE 115r, UE-N (identified by the block 812c), and the same LCG ID-N identified by (identified by the block 812c).

As shown by the expanded view 802, each block 822 includes a destination index field 840, a LCG ID field 842, and a subchannel information field 844. In some instances, the destination index field 840, the LCG ID field 842, and the subchannel information field 844 together occupies two octets. As such, the second group block 820 may have a length of K2×2 octets, where K2 is the number of blocks 822 in the second group block 820. The destination index field 840 may identify a same target sidelink receiving UE 115r as in the first group block 810. The LCG ID field 842 may identify a same LCG ID of a corresponding target sidelink receiving UE 115r as in the first group block 810. The subchannel information field 844 may indicate subchannel information associated with the sidelink receiving UE identified by the destination index field 840 and the LCG identified by the LCG ID field 842.

In some aspects, the subchannel information field 844 may indicate at least one of one or more preferred subchannels or a number of subchannels for a respective sidelink receiving UE 115r. As explained above, the sidelink transmitting UE 115t may sound each subchannel of a plurality of subchannels in a radio frequency band that may be used for sidelink communication with one or more sidelink receiving UEs 115r, for example, by transmitting a CSI-RS in each subchannel Each of the sidelink receiving UEs 115r may report CSI (e.g., including RI and/or CQI) for each subchannel to the sidelink transmitting UE 115t. The sidelink transmitting UE 115t may determine the subchannel information based on the CSI reports received from each sidelink receiving UE 115r. In some aspects, the first group block 810 includes multiple blocks 812 for the same destination UE with different LCG IDs, but the second group block 820 may include one block 822 for the destination UE as subchannel information is on a per-UE basis. In other words, the first group block 810 may include one block 812 per LCG ID and per destination UE, whereas the second group block 820 may include one block 822 per destination UE. Thus, the message structure 800 can be more efficient than the message structures 500, 600, and 700 when there are many LCG IDs with data ready for transmission to a particular destination UE.

In some aspects, the subchannel information field 844 may indicate the one or more preferred subchannels in an order of preference (e.g., in an increasing order of preference or a decreasing order of preference) for communicating data of a respective LCG (identified by the LCG ID field 842) with a respective sidelink receiving UE 115r (identified by the destination index field 840). In some aspects, the subchannel information field 844 may indicate a codeword indicating a starting subchannel of the one or more subchannels and the number of subchannels (e.g., beginning from the starting subchannel), for example, as discussed above with respect to FIG. 5. In some aspects, the subchannel information field 844 may indicate a number of subchannels in a list of preferred subchannel and a first preferred subchannel in the list of preferred subchannels for a respective sidelink receiving UE 115r, for example, as discussed above with respect to FIG. 6. In some aspects, the subchannel information field 844 may indicate at least one of RI, a CQI for a subchannel associated with a respective sidelink receiving UE 115r, for example, as discussed above with respect to FIG. 7. In some aspects, depending on the size of a UL grant for the BSR 804, the sidelink transmitting UE 115t may not include subchannel information for all destination UEs in the second group block 820. For instance, the first group block 810 may indicate buffer information for five destination UEs, but the second group block 820 may indicate subchannel information for one of the five destination UEs. In other words, the sidelink transmitting UE 115t may determine a number of blocks 822 to include in the second group block 820 based on a resource size granted by the UL grant.

In some aspects, the sidelink transmitting UE 115t may transmit a single MAC-CE including the BSR 804. For instance, the sidelink transmitting UE 115t may generate a block 812, for each destination and each LCG, including an indication of an amount of data ready for transmission. The sidelink transmitting UE 115t may append each block 812 one after another to generate the first group block 810. The sidelink transmitting UE 115t may generate a block 822 by repeating a destination index and a LCG ID in each of the block 812 and including respective subchannel information. In some instances, the sidelink transmitting UE 115t may repeat a block 822 with the same destination ID and LCG IDs and add additional subchannel information if there are more preferred subchannels or CSI (e.g., RI and/or CQI) to be indicated. The sidelink transmitting UE 115t may append each block 822 one after another to generate the second group block 820. The sidelink transmitting UE 115t may append the second group block 820 to the first group block 810 to generate the MAC-CE. In some aspects, the first group block 810 may be similar to a BSR MAC-CE as in 3GPP.

In other aspects, the sidelink transmitting UE 115t may transmit a bundled MAC-CE including the first group block 810 and the second group block 820. The sidelink transmitting UE 115t may generate a first MAC-CE from the first group block 810 and a second MAC-CE from the second group block 820 and transmit the first and second MAC-CEs as a bundled MAC-CE in a single transmission (e.g., based on a single UL grant).

Figure 9:
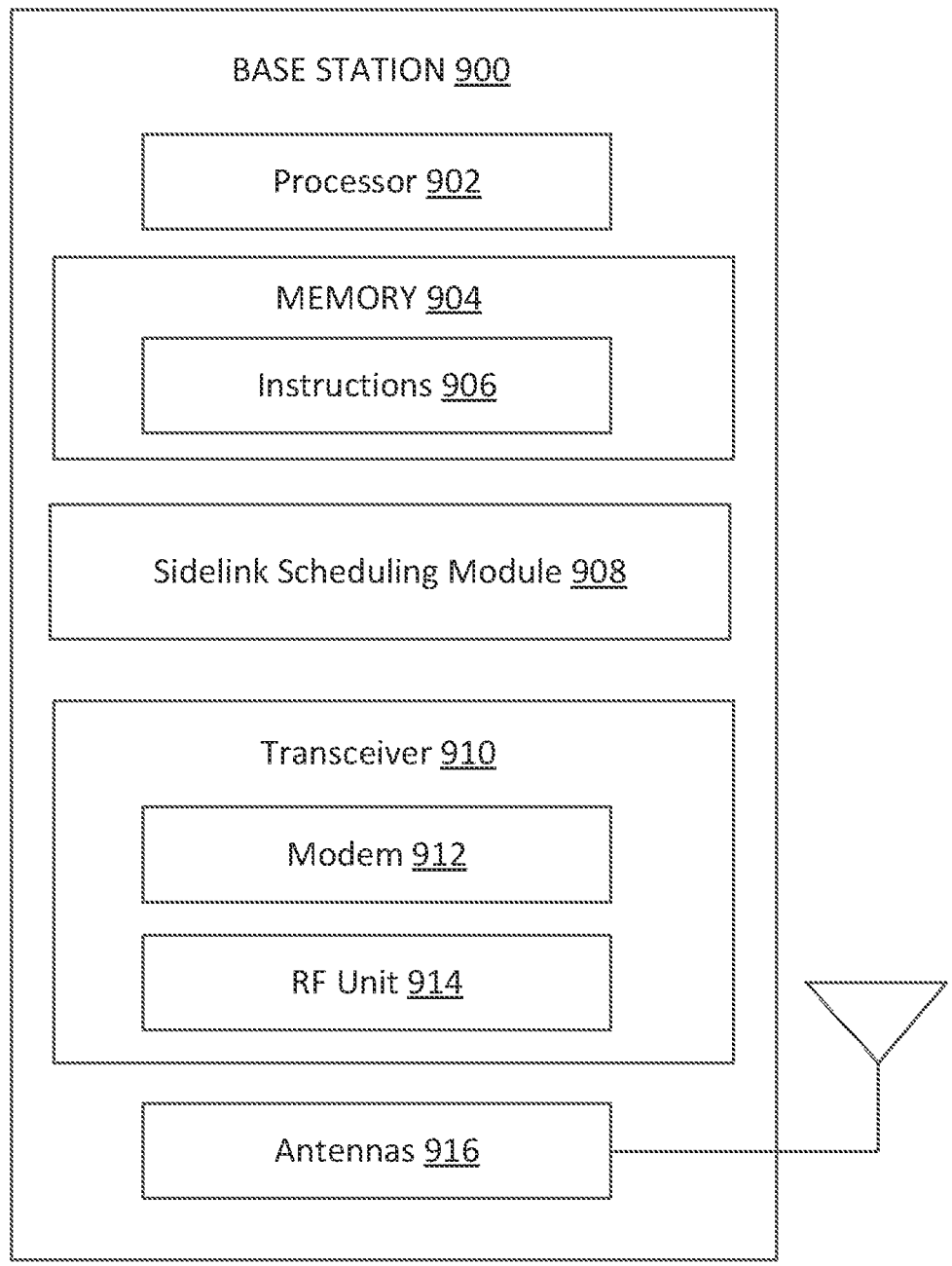
FIG. 9 illustrates a block diagram of a base station (BS) according to some aspects of the present disclosure.

FIG. 9 is a block diagram of an exemplary BS 900 according to some aspects of the present disclosure. The BS 900 may be a BS 95 as discussed in FIGS. 1-2, 3A-3C, and 4-8. A shown, the BS 900 may include a processor 902, a memory 904, a sidelink scheduling module 908, a transceiver 910 including a modem subsystem 912 and a RF unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 1-2, 3A-3C, 4-8, and 12. Instructions 906 may also be referred to as program code. The program code may be for causing a wireless communication device to perform these operations, for example by causing one or more processors (such as processor 902) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink scheduling module 908 may be implemented via hardware, software, or combinations thereof. For example, the sidelink scheduling module 908 may be implemented as a processor, circuit, and/or instructions 906 stored in the memory 904 and executed by the processor 902. In some examples, the sidelink scheduling module 908 can be integrated within the modem subsystem 912. For example, the sidelink scheduling module 908 can be implemented by a combination of software components (e.g., executed by a DSP or a general processor) and hardware components (e.g., logic gates and circuitry) within the modem subsystem 912. The sidelink scheduling module 908 may communicate with one or more components of BS 900 to implement various aspects of the present disclosure, for example, aspects of FIGS. 1-2, 3A-3C, 4-8, and 12.

For instance, the sidelink scheduling module 908 is configured to receive, from a first UE (e.g., a UE 115 or UE 1000), a BSR indicating subchannel information associated with one or more UEs. The first UE may be a sidelink transmitting UE and the one or more UEs may be sidelink receiving UE(s) that the sidelink transmitting UE desires to communicate with. For instance, the first UE may have data ready for transmission to each of the one or more UEs. In some aspects, the BSR further indicates at least one of a destination index, a logical channel group (LCG) identifier (ID), or a buffer size associated with a second UE of the one or more UEs.

In some aspects, the subchannel information indicates at least one of one or more subchannels or a number of subchannels associated with the second UE. In some aspects, the subchannel information indicates the one or more subchannels in an order of preference. In some aspects, the subchannel information comprises a codeword indicating a starting subchannel of the one or more subchannels and the number of subchannels (e.g., beginning from the starting subchannel) recommended for transmitting data to the second UE, for example, as discussed above with respect to FIG. 5. In some aspects, the subchannel information indicates the number of subchannels by indicating a number of subchannels in the one or more subchannels recommended for transmitting data to the second UE, for example, as discussed above with respect to FIG. 6. In some aspects, the BSR includes a first block and a second block. The first block indicates a first LCG ID associated with the second UE, the common number of subchannels, and a first subchannel of the one or more subchannels. The second block indicates a second LCG ID associated with the first UE and a second subchannel of the one or more subchannels, where the second subchannel is different from the first subchannel. In one aspects, the first LCG ID is the same as the second LCG ID. In another aspects, the first LCG ID is different from the second LCG ID.

In some aspects, the subchannel information indicates at least one of RI, a CQI, or a subchannel associated with the second UE, for example, as discussed above with respect to FIG. 7.

In some aspects, the BSR may include multiple blocks for a particular LCG ID associated with the second UE. For instance, the BSR may include a first block and a second block. The first block includes a destination index, a LCG ID, a buffer size, and first subchannel information associated with the second UE. The second block includes the destination index, the LCG ID, the buffer size, and second subchannel information associated with the second UE, where the second subchannel information is different from the first subchannel information.

In some aspects, the BSR may include multiple blocks for different LCG IDs associated with the second UE. For instance, the BSR may include a first block and a second block. The first block includes a destination index, a first LCG ID, a first buffer size, and first subchannel information associated with the second UE. The second block includes the destination index, a second LCG ID different from the first LCG ID, a second buffer size, and second subchannel information associated with the second UE.

In some aspects, as part of receiving the BSR, the sidelink scheduling module 908 is configured to receive, from the first UE, a MAC-CE including a first block and a second block, for example, as discussed above with respect to FIG. 5-7. The first block includes a first destination index, a first LCG ID, a first buffer size, and first subchannel information associated with the second UE. The second block includes a second block comprising a second destination index, a second LCG ID, a second buffer size, and second subchannel information associated with a third UE of the one or more UEs.

In some aspects, as part of transmitting the BSR, the sidelink scheduling module 908 is configured to receive, from the first UE, a medium access control-control element (MAC-CE) including a first block (e.g., the first group block 810) and a second block (e.g., the second group block 820), for example, as discussed above with respect to FIG. 8. The first block includes a destination index, a logical channel group identifier (LCG ID), and a buffer size associated with the second UE. The second block includes first subchannel information associated with the first UE and at least one of the destination index or the LCG ID.

In some aspects, as part of transmitting the BSR, the sidelink scheduling module 908 is configured to receive, from the first UE, a bundled medium access control-control element (MAC-CE) including a first MAC-CE and a second MAC-CE, for example, as discussed above with respect to FIG. 8. The first MAC-CE includes a destination index, a logical channel group identifier (LCG ID), and a buffer size associated with the second UE. The second MAC-CE includes first subchannel information associated with the first UE and at least one of the destination index or the LCG ID.

In some aspects, the sidelink scheduling module 908 is configured to transmit to the first UE in response to the BSR report, a grant for transmitting a first sidelink transmission to a second UE of the one or more UEs. For instance, the grant may indicate a sidelink resource allocated to the first UE for the first sidelink transmission. The sidelink resource may include one or more symbols (e.g., the symbols 206) and one or more subcarriers (e.g., the subcarriers 204) in frequency, where the one or more subcarriers may be within a subchannel indicated by the BSR. In some aspects, the sidelink scheduling module 908 is configured to allocate the resource in the subchannel based on the received BSR.

As shown, the transceiver 910 may include the modem subsystem 912 and the RF unit 914. The transceiver 910 can be configured to communicate bi-directionally with other devices, such as the UEs 115 and/or UE 900 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., sidelink transmission grants, etc.) from the modem subsystem 912 (on outbound transmissions) or of transmissions originating from another source such as a UE 115 and/or UE 1000. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 900 to enable the BS 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The transceiver 910 may provide the demodulated and decoded data (e.g., BSR, MAC-CE, etc.) to the sidelink scheduling module 908 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

In an example, the transceiver 910 is configured to communicate with components of the BS 900 to receive, from a first UE, a BSR indicating subchannel information associated with one or more UEs, and transmit, to the first UE in response to the BSR report, a grant for transmitting a first sidelink transmission to a second UE of the one or more UEs.

Figure 10:
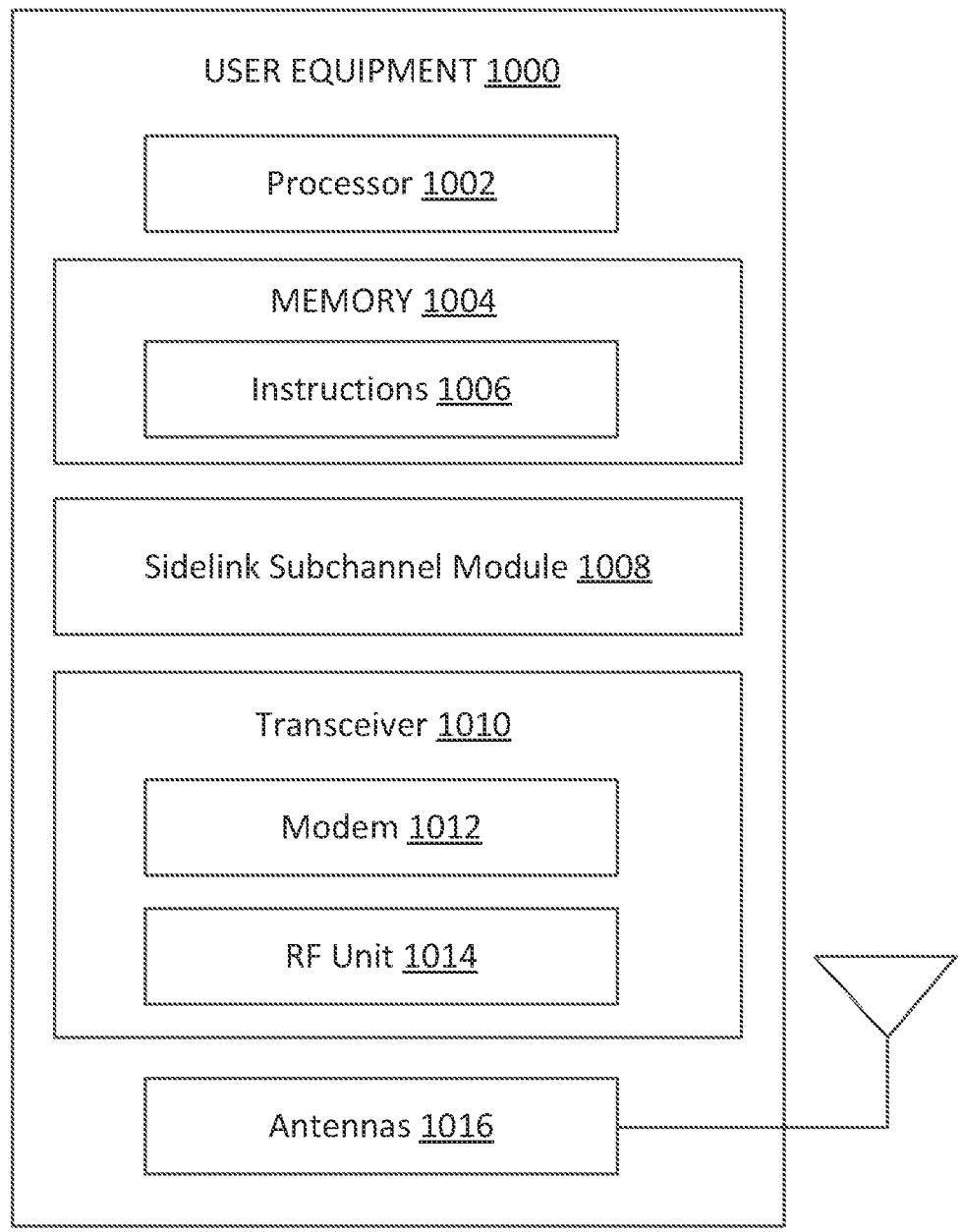
FIG. 10 illustrates a block diagram of a user equipment (UE) according to some aspects of the present disclosure.

FIG. 10 is a block diagram of an exemplary UE 1000 according to some aspects of the present disclosure. The UE 1000 may be a UE 115 as discussed above in FIGS. 1-2, 3A-3C, and 4-8. As shown, the UE 1000 may include a processor 1002, a memory 1004, a sidelink subchannel module 1008, a transceiver 1010 including a modem subsystem 1012 and a radio frequency (RF) unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store, or have recorded thereon, instructions 1006. The instructions 1006 may include instructions that, when executed by the processor 1002, cause the processor 1002 to perform the operations described herein with reference to a UE 115 or an anchor in connection with aspects of the present disclosure, for example, aspects of FIGS. 1-2, 3A-3C, 4-8, and 11. Instructions 1006 may also be referred to as code, which may be interpreted broadly to include any type of computer-readable statement(s) as discussed above with respect to FIG. 9.

The sidelink subchannel module 1008 may be implemented via hardware, software, or combinations thereof. For example, the sidelink subchannel module 1008 may be implemented as a processor, circuit, and/or instructions 1006 stored in the memory 1004 and executed by the processor 1002. In some aspects, the sidelink subchannel module 1008 can be integrated within the modem subsystem 1012. For example, the sidelink subchannel module 1008 can be implemented by a combination of software components (e.g., executed by a DSP or a general processor) and hardware components (e.g., logic gates and circuitry) within the modem subsystem 1012. The sidelink subchannel module 1008 may communicate with one or more components of the UE 1000 to implement various aspects of the present disclosure, for example, aspects of FIGS. 1-2, 3A-3C, 4-8, and 11.

For instance, the sidelink subchannel module 1008 is configured to transmit, to a BS (e.g., a BS 105 or BS 900), a buffer status report (BSR) indicating subchannel information associated with one or more UEs. The UE 1000 may be a sidelink transmitting UE and the one or more UEs may be sidelink receiving UE(s) that the UE 1000 desires to communicate with. For instance, the UE 1000 may have data ready for transmission to each of the one or more UEs. In some aspects, the BSR further indicates at least one of a destination index, a logical channel group (LCG) identifier (ID), or a buffer size associated with a second UE of the one or more UEs.

In some aspects, the subchannel information indicates at least one of one or more subchannels or a number of subchannels associated with the second UE. In some aspects, the subchannel information indicates the one or more subchannels in an order of preference. In some aspects, the subchannel information comprises a codeword indicating a starting subchannel of the one or more subchannels and the number of subchannels (e.g., beginning from the starting subchannel) recommended for transmitting data to the second UE, for example, as discussed above with respect to FIG. 5. In some aspects, the subchannel information indicates the number of subchannels by indicating a number of subchannels in the one or more subchannels recommended for transmitting data to the second UE, for example, as discussed above with respect to FIG. 6. In some aspects, the BSR includes a first block and a second block. The first block indicates a first LCG ID associated with the second UE, the common number of subchannels, and a first subchannel of the one or more subchannels. The second block indicates a second LCG ID associated with the second UE and a second subchannel of the one or more subchannels, where the second subchannel is different from the first subchannel. In one aspects, the first LCG ID is the same as the second LCG ID. In other aspects, the first LCG ID is different from the second LCG ID.

In some aspects, the subchannel information indicates at least one of RI, a CQI, or a subchannel associated with the second UE, for example, as discussed above with respect to FIG. 7.

In some aspects, the BSR may include multiple blocks for a particular LCG ID associated with the second UE. For instance, the BSR may include a first block and a second block. The first block includes a destination index, a LCG ID, a buffer size, and first subchannel information associated with the second UE. The second block includes the destination index, the LCG ID, the buffer size, and second subchannel information associated with the second UE, where the second subchannel information is different from the first subchannel information.

In some aspects, the BSR may include multiple blocks for different LCG IDs associated with the second UE. For instance, the BSR may include a first block and a second block. The first block includes a destination index, a first LCG ID, a first buffer size, and first subchannel information associated with the second UE. The second block includes the destination index, a second LCG ID different from the first LCG ID, a second buffer size, and second subchannel information associated with the second UE.

In some aspects, as part of transmitting the BSR, the sidelink subchannel module 1008 is configured to transmit, to the BS, a MAC-CE including a first block and a second block, for example, as discussed above with respect to FIGS. 5-7. The first block includes a first destination index, a first LCG ID, a first buffer size, and first subchannel information associated with the second UE. The second block includes a second block comprising a second destination index, a second LCG ID, a second buffer size, and second subchannel information associated with a third UE of the one or more UEs.

In some aspects, as part of transmitting the BSR, the sidelink subchannel module 1008 is configured to transmit, to the BS, a MAC-CE including a first block (e.g., the first group block 810) and a second block (e.g., the second group block 820), for example, as discussed above with respect to FIG. 8. The first block includes a destination index, a LCG ID, and a buffer size associated with the second UE. The second block includes first subchannel information associated with the second UE and at least one of the destination index or the LCG ID.

In some aspects, as part of transmitting the BSR, the sidelink subchannel module 1008 is configured to transmit to the BS, a bundled medium access control-control element (MAC-CE) including a first MAC-CE and a second MAC-CE, for example, as discussed above with respect to FIG. 8. The first MAC-CE includes a destination index, a logical channel group identifier (LCG ID), and a buffer size associated with the second UE. The second MAC-CE includes first subchannel information associated with the second UE and at least one of the destination index or the LCG ID.

In some aspects, the sidelink subchannel module 1008 is further configured to receive, from the BS in response to the BSR report, a grant for transmitting a first sidelink transmission to the second UE. For instance, the grant may indicate a sidelink resource allocated to the first UE for the first sidelink transmission. The sidelink resource may include one or more symbols (e.g., the symbols 206) and one or more subcarriers (e.g., the subcarriers 204) in frequency, where the one or more subcarriers may be within a subchannel indicated by the BSR.

In some aspects, the sidelink subchannel module 1008 is further configured to transmit, to the second UE based on the grant, the first sidelink transmission. For instance, as part of transmitting the first sidelink transmission, the sidelink subchannel module 1008 is configured to transmit the first sidelink transmission (e.g., including SCI in a PSCCH and data in a PSSCH using the sidelink resource.

As shown, the transceiver 1010 may include the modem subsystem 1012 and the RF unit 1014. The transceiver 1010 can be configured to communicate bi-directionally with other devices, such as the BSs 105 and 900. The modem subsystem 1012 may be configured to modulate and/or encode the data from the memory 1004 and/or the sidelink subchannel module 1008 according to a modulation and coding scheme (MCS), e.g., a low-density parity check (LDPC) coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., BSR, MAC-CE, CSI-RS, PSCCH signals, SCI, PSSCH signals, sidelink data, etc.) from the modem subsystem 1012 (on outbound transmissions) or of transmissions originating from another source such as a UE 115, a BS 105, or an anchor. The RF unit 1014 may be further configured to perform analog beamforming in conjunction with the digital beamforming. Although shown as integrated together in transceiver 1010, the modem subsystem 1012 and the RF unit 1014 may be separate devices that are coupled together at the UE 115 to enable the UE 115 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices. The antennas 1016 may provide the received data messages for processing and/or demodulation at the transceiver 1010. The transceiver 1010 may provide the demodulated and decoded data (e.g., sidelink transmission grants, etc.) to the sidelink subchannel module 1008 for processing. The antennas 1016 may include multiple antennas of similar or different designs in order to sustain multiple transmission links.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

In an example, transceiver 1010 is coupled to the components of the UE 1000 and configured to transmit, to a base station (BS), a buffer status report (BSR) indicating subchannel information associated with one or more UEs, receive, from the BS in response to the BSR report, a grant for transmitting a first sidelink transmission to a second UE of the one or more UEs, and transmits, to the second UE based on the grant, the first sidelink transmission.

Figure 11:
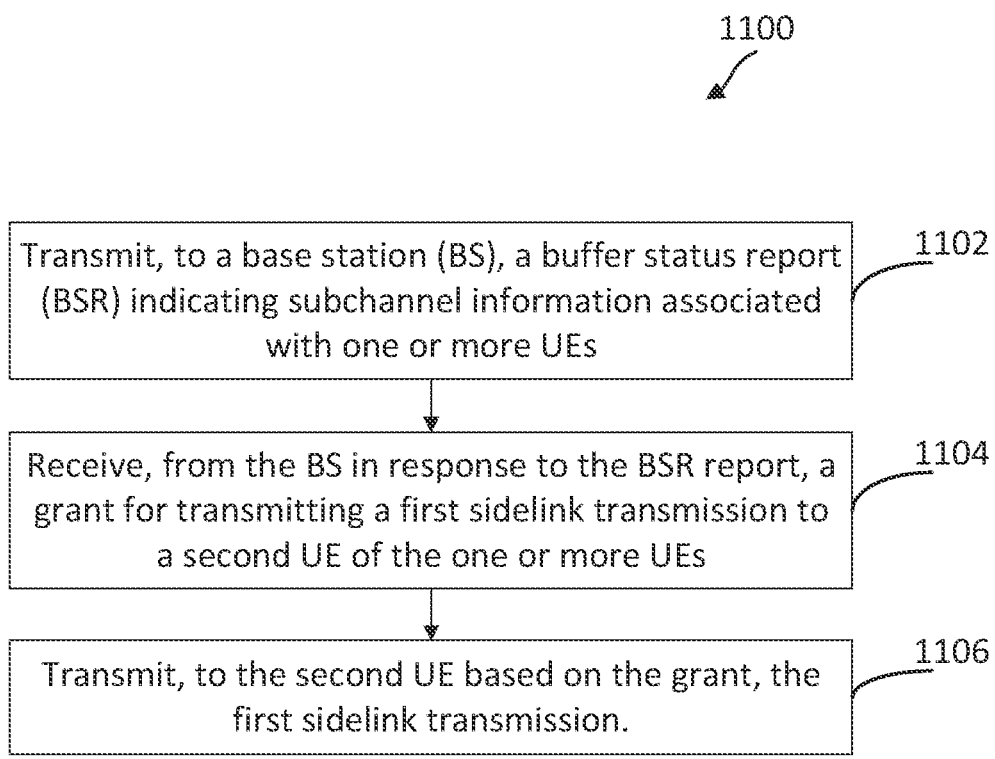
FIG. 11 is a flow diagram of a wireless communication method according to some aspects of the present disclosure.

FIG. 11 is a flow diagram illustrating a wireless communication method 1100 according to some aspects of the present disclosure. Aspects of the method 1100 can be executed by a computing device (e.g., a processor, processing circuit, and/or other suitable component) of a wireless communication device or other suitable means for performing the blocks. For example, a wireless communication device, such as the UE 115 or the UE 1000, may utilize one or more components, such as the processor 1002, the memory 1004, the sidelink subchannel module 1008, the transceiver 1010, the modem 1012, the RF unit 1014, and the one or more antennas 1016, to execute the blocks of method 1100. The method 1100 may employ similar mechanisms as described in FIGS. 1-2, 3A-3C, and 4-8. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1102, a first UE (e.g., a UE 115 or UE 1000) transmits, to a BS (e.g., a BS 105 or BS 900), a buffer status report (BSR) indicating subchannel information associated with one or more UEs. The first UE may be a sidelink transmitting UE and the one or more UEs may be sidelink receiving UE(s) that the sidelink transmitting UE desires to communicate with. For instance, the first UE may have data ready for transmission to each of the one or more UEs. In some aspects, the BSR further indicates at least one of a destination index, a logical channel group (LCG) identifier (ID), or a buffer size associated with a second UE of the one or more UEs. In some aspects, means for performing the functionality of step 1102 can, but not necessarily, include, for example, sidelink subchannel module 1008, transceiver 1010, antennas 1016, processor 1002, and/or memory 1004 with reference to FIG. 10.

In some aspects, the subchannel information indicates at least one of one or more subchannels or a number of subchannels associated with the second UE. For instance, the first UE may communicate with the second UE over a sidelink channel including a plurality of subchannels. The first UE may transmit one or more reference signal (e.g., CSI-RS) in one or more subchannels of the plurality of subchannels to the second UE. The second UE may report CSI (e.g., RI, CQI, etc.) for each of the one or more reference signals to the first UE. The first UE may determine the at least one of the one or more subchannels or a number of subchannels from the plurality of channels based on the received CSI report.

In some aspects, the subchannel information indicates the one or more subchannels in an order of preference. In some aspects, the subchannel information comprises a codeword indicating a starting subchannel of the one or more subchannels and the number of subchannels (e.g., beginning from the starting subchannel) recommended for transmitting data to the second UE, for example, as discussed above with respect to FIG. 5. In some aspects, the subchannel information indicates the number of subchannels by indicating a common number of subchannels in the one or more subchannels recommended for transmitting data to the second UE, for example, as discussed above with respect to FIG. 6. In some aspects, the BSR includes a first block and a second block. The first block indicates a first LCG ID associated with the second UE, the common number of subchannels, and a first subchannel of the one or more subchannels. The second block indicates a second LCG ID associated with the second UE and a second subchannel of the one or more subchannels, where the second subchannel is different from the first subchannel. In one aspects, the first LCG ID is the same as the second LCG ID. In another aspect, the first LCG ID is different from the second LCG ID.

In some aspects, the subchannel information indicates at least one of a RI, a CQI, or a subchannel associated with the second UE, for example, as discussed above with respect to FIG. 7. For instance, the first UE may transmit one or more reference signal (e.g., CSI-RS) in one or more subchannels of the plurality of subchannels to the second UE, and the second UE may report CSI for each of the one or more reference signals to the first UE as explained above. The RI and/or CQI in the subchannel information may be RI and/or CQI that the first UE received from the second UE in the CSI report. In some instances, the first UE may receive multiple CSI reports from the second UE, and the RI and/or CQI in the subchannel information may be from a most recent CSI report received from the second UE.

In some aspects, the BSR may include multiple blocks for a particular LCG ID associated with the second UE. For instance, the BSR includes a first block and a second block. The first block includes a destination index, a logical channel group identifier (LCG ID), a buffer size, and first subchannel information associated with the second UE. The second block includes the destination index, the LCG ID, the buffer size, and second subchannel information associated with the second UE, where the second subchannel information is different from the first subchannel information.

In some aspects, the BSR may include multiple blocks for different LCG IDs associated with the second UE. For instance, the BSR includes a first block and a second block.

The first block includes a destination index, a first LCG ID, a first buffer size, and first subchannel information associated with the second UE. The second block includes the destination index, a second LCG ID different from the first LCG ID, a second buffer size, and second subchannel information associated with the second UE.

In some aspects, as part of transmitting the BSR, the first UE transmits, to the BS, a medium access control-control element (MAC-CE) including a first block and a second block, for example, as discussed above with respect to FIGS. 5-7. The first block includes a first destination index, a first logical channel group identifier (LCG ID), a first buffer size, and first subchannel information associated with the second UE. The second block includes a second block comprising a second destination index, a second LCG ID, a second buffer size, and second subchannel information associated with a third UE of the one or more UEs.

In some aspects, as part of transmitting the BSR, the first UE transmits, to the BS, a medium access control-control element (MAC-CE) including a first block and a second block, for example, as discussed above with respect to FIG. 8. The first block includes a destination index, a logical channel group identifier (LCG ID), and a buffer size associated with the second UE. The second block includes first subchannel information associated with the second UE and at least one of the destination index or the LCG ID.

In some aspects, as part of transmitting the BSR, the first UE transmits to the BS, a bundled medium access control-control element (MAC-CE) including a first MAC-CE and a second MAC-CE, for example, as discussed above with respect to FIG. 8. The first MAC-CE includes a destination index, a logical channel group identifier (LCG ID), and a buffer size associated with the second UE. The second MAC-CE includes first subchannel information associated with the second UE and at least one of the destination index or the LCG ID.

At block 1104, the first UE receives, from the BS in response to the BSR report, a grant for transmitting a first sidelink transmission to the second UE of the one or more UEs. For instance, the grant may indicate a sidelink resource allocated to the first UE for the first sidelink transmission. The sidelink resource may include one or more symbols (e.g., the symbols 206) and one or more subcarriers (e.g., the subcarriers 204) in frequency, where the one or more subcarriers may be within a subchannel indicated by the BSR. In some aspects, means for performing the functionality of step 1104 can, but not necessarily, include, for example, sidelink subchannel module 1008, transceiver 1010, antennas 1016, processor 1002, and/or memory 1004 with reference to FIG. 10.

At block 1106, the first UE transmits, to the second UE based on the grant, the first sidelink transmission. For instance, the first UE may transmit the first sidelink transmission (e.g., including SCI in a PSCCH and data in a PSSCH using the sidelink resource.

Figure 12:
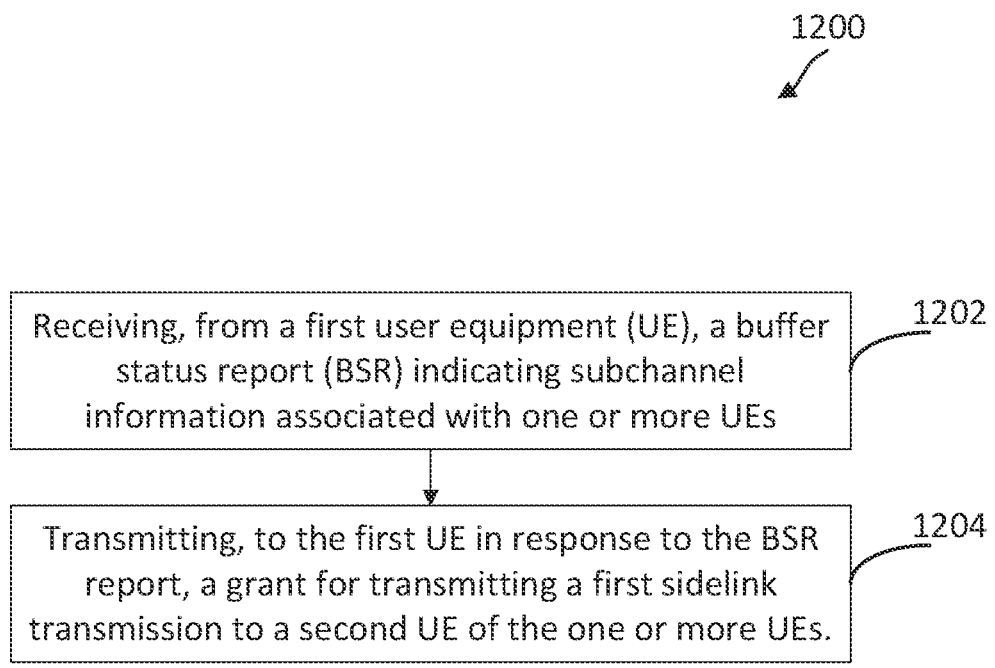
FIG. 12 is a flow diagram of a wireless communication method according to some aspects of the present disclosure.

FIG. 12 is a flow diagram illustrating a wireless communication method 1200 according to some aspects of the present disclosure. Aspects of the method 1200 can be executed by a computing device (e.g., a processor, processing circuit, and/or other suitable component) of a wireless communication device or other suitable means for performing the blocks. For example, a wireless communication device, such as the BS 105 or the BS 900, may utilize one or more components, such as the processor 902, the memory 904, the sidelink scheduling module 908, the transceiver 910, the modem 912, the RF unit 914, and the one or more antennas 916, to execute the blocks of method 1200. The method 1200 may employ similar mechanisms as described in FIGS. 1-2, 3A-3C, and 4-8. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1202, a BS (e.g., a BS 105 or BS 900) receives, from a first UE (e.g., a UE 115 or UE 1000), a BSR indicating subchannel information associated with one or more UEs. The first UE may be a sidelink transmitting UE and the one or more UEs may be sidelink receiving UE(s) that the sidelink transmitting UE desires to communicate with. For instance, the first UE may have data ready for transmission to each of the one or more UEs. In some aspects, the BSR further indicates at least one of a destination index, a logical channel group (LCG) identifier (ID), or a buffer size associated with a second UE of the one or more UEs. In some aspects, means for performing the functionality of step 1202 can, but not necessarily, include, for example, sidelink scheduling module 908, transceiver 910, antennas 916, processor 912, and/or memory 904 with reference to FIG. 9.

In some aspects, the subchannel information indicates at least one of one or more subchannels or a number of subchannels associated with the second UE. In some aspects, the subchannel information indicates the one or more subchannels in an order of preference. In some aspects, the subchannel information comprises a codeword indicating a starting subchannel of the one or more subchannels and the number of subchannels (e.g., beginning from the starting subchannel) recommended for transmitting data to the second UE, for example, as discussed above with respect to FIG. 5. In some aspects, the subchannel information indicates the number of subchannels by indicating a common number of subchannels in the one or more subchannels recommended for transmitting data to the second UE, for example, as discussed above with respect to FIG. 6. In some aspects, the BSR includes a first block and a second block. The first block indicates a first LCG ID associated with the second UE, the common number of subchannels, and a first subchannel of the one or more subchannels. The second block indicates a second LCG ID associated with the first UE and a second subchannel of the one or more subchannels, where the second subchannel is different from the first subchannel. In one aspect, the first LCG ID is the same as the second LCG ID. In another aspect, the first LCG ID is different from the second LCG ID.

In some aspects, the subchannel information indicates at least one of RI, a CQI, or a subchannel associated with the second UE, for example, as discussed above with respect to FIG. 7.

In some aspects, the BSR includes a first block and a second block. The first block includes a destination index, a logical channel group identifier (LCG ID), a buffer size, and first subchannel information associated with the second UE. The second block includes the destination index, the LCG ID, the buffer size, and second subchannel information associated with the second UE, where the second subchannel information is different from the first subchannel information.

In some aspects, the BSR includes a first block and a second block. The first block includes a destination index, a first logical channel group identifier (LCG ID), a first buffer size, and first subchannel information associated with the second UE. The second block includes the destination index, a second LCG ID different from the first LCG ID, a second buffer size, and second subchannel information associated with the second UE.

In some aspects, as part of receiving the BSR, the BS receives, from the first UE, a medium access control-control element (MAC-CE) including a first block and a second block, for example, as discussed above with respect to FIG. 5-7. The first block includes a first destination index, a first logical channel group identifier (LCG ID), a first buffer size, and first subchannel information associated with the second UE. The second block includes a second block comprising a second destination index, a second LCG ID, a second buffer size, and second subchannel information associated with a third UE of the one or more UEs.

In some aspects, as part of transmitting the BSR, the BS receives, from the first UE, a medium access control-control element (MAC-CE) including a first block and a second block, for example, as discussed above with respect to FIG. 8. The first block includes a destination index, a logical channel group identifier (LCG ID), and a buffer size associated with the second UE. The second block includes first subchannel information associated with the first UE and at least one of the destination index or the LCG ID.

In some aspects, as part of transmitting the BSR, the BS receives, from the first UE, a bundled medium access control-control element (MAC-CE) including a first MAC-CE and a second MAC-CE, for example, as discussed above with respect to FIG. 8. The first MAC-CE includes a destination index, a logical channel group identifier (LCG ID), and a buffer size associated with the second UE. The second MAC-CE includes first subchannel information associated with the first UE and at least one of the destination index or the LCG ID.

At block 1204, the BS transmits to the first UE in response to the BSR report, a grant for transmitting a first sidelink transmission to a second UE of the one or more UEs. For instance, the grant may indicate a sidelink resource allocated to the first UE for the first sidelink transmission. The sidelink resource may include one or more symbols (e.g., the symbols 206) and one or more subcarriers (e.g., the subcarriers 204) in frequency, where the one or more subcarriers may be within a subchannel indicated by the BSR. In some aspects, the BS may allocate the resource based on the received BSR. For instance, the BS may allocate the resource in a subchannel of the one or more (preferred) subchannels indicated for the second UE by the BSR. The BS may determine a resource size (e.g., a number of symbols in time and/or a number of subcarriers in frequency) based on a buffer size indicated for the second UE by the BSR. In some aspects, means for performing the functionality of step 1204 can, but not necessarily, include, for example, sidelink scheduling module 908, transceiver 910, antennas 916, processor 912, and/or memory 904 with reference to FIG. 9.

Further aspects of the present disclosure include the following:

1. A method of wireless communication performed by a first user equipment (UE), the method comprising:
   transmitting, to a base station (BS), a buffer status report (BSR) indicating subchannel information associated with one or more UEs;
   receiving, from the BS in response to the BSR report, a grant for transmitting a first sidelink transmission to a second UE of the one or more UEs; and
   transmitting, to the second UE based on the grant, the first sidelink transmission.

2. The method of aspect 1, wherein:
   the transmitting the BSR comprises:
   transmitting, to the BS, the BSR further indicating at least one of a destination index, a logical channel group (LCG) identifier (ID), or a buffer size associated with the second UE, and
   the subchannel information indicates at least one of one or more subchannels or a number of subchannels associated with the second UE.

3. The method of any of aspects 1-2, wherein the subchannel information indicates the one or more subchannels in an order of preference.

4. The method of any of aspects 1-3, wherein the subchannel information comprises a codeword indicating a starting subchannel of the one or more subchannels and the number of subchannels.

5. The method of aspect any of aspects 1-3, wherein the subchannel information indicates the number of subchannels by indicating a common number of subchannels in the one or more subchannels.

6. The method of aspect 5, wherein the transmitting the BSR further comprises:
   transmitting, to the BS, the BSR comprising:
   a first block indicating a first LCG ID associated with the second UE, the common number of subchannels, and a first subchannel of the one or more subchannels; and
   a second block indicating a second LCG ID associated with the second UE and a second subchannel of the one or more subchannels, the second subchannel being different from the first subchannel.

7. The method of any of aspects 1, wherein:
   the transmitting the BSR comprises:
   transmitting, to the BS, the BSR further indicating at least one of a destination index, a logical channel group (LCG) identifier (ID), or a buffer size associated with the second UE, and
   the subchannel information indicates at least one of a rank indicator (RI), a channel quality indicator (CQI), or a subchannel associated with the second UE.

8. The method of any of aspects 1-7, wherein the transmitting the BSR comprises:
   transmitting, to the BS, the BSR comprising:
   a first block comprising a destination index, a logical channel group identifier (LCG ID), a buffer size, and first subchannel information associated with the second UE; and
   a second block comprising the destination index, the LCG ID, the buffer size, and second subchannel information associated with the second UE, the second subchannel information being different from the first subchannel information.

9. The method of any of aspects 1-7, wherein the transmitting the BSR including the subchannel information further comprises:
   transmitting, to the BS, the BSR comprising:
   a first block comprising a destination index, a first logical channel group identifier (LCG ID), a first buffer size, and first subchannel information associated with the second UE; and
   a second block comprising the destination index, a second LCG ID different from the first LCG ID, a second buffer size, and second subchannel information associated with the second UE.

10. The method of any of aspects 1-7, wherein the transmitting the BSR comprises:
    transmitting, to the BS, a medium access control-control element (MAC-CE) comprising:

a first block comprising a first destination index, a first logical channel group identifier (LCG ID), a first buffer size, and first subchannel information associated with the second UE; and a second block comprising a second destination index, a second LCG ID, a second buffer size, and second subchannel information associated with a third UE of the one or more UEs.

11. The method of any of aspects 1-10, wherein the transmitting the BSR comprises:

transmitting, to the BS, a medium access control-control element (MAC-CE) comprising:

a first block comprising a destination index, a logical channel group identifier (LCG ID), and a buffer size associated with the second UE; and a second block comprising first subchannel information associated with the second UE and at least one of the destination index or the LCG ID.

12. The method of any of aspects 1-10, wherein the transmitting the BSR comprises:

transmitting, to the BS, a bundled medium access control-control element (MAC-CE) comprising:

a first MAC-CE comprising a destination index, a logical channel group identifier (LCG ID), and a buffer size associated with the second UE; and a second MAC-CE comprising first subchannel information associated with the second UE and at least one of the destination index or the LCG ID.

13. A method of wireless communication performed by a base station (BS), the method comprising:

receiving, from a first user equipment (UE), a buffer status report (BSR) indicating subchannel information associated with one or more UEs; and transmitting, to the first UE in response to the BSR report, a grant for transmitting a first sidelink transmission to a second UE of the one or more UEs.

14. The method of aspect 13, wherein:

the receiving the BSR comprises:

receiving, from the first UE, the BSR further indicating at least one of a destination index, a logical channel group (LCG) identifier (ID), or a buffer size associated with the second UE, and the subchannel information indicates at least one of one or more subchannels or a number of subchannels associated with the second UE.

15. The method of any of aspects 13-14, wherein the subchannel information indicates the one or more subchannels in an order of preference.

16. The method of any of aspects 13-15, wherein the subchannel information comprises a codeword indicating a starting subchannel of the one or more subchannels and the number of subchannels.

17. The method of any of aspects 13-15, wherein the subchannel information indicates the number of subchannels by indicating a common number of subchannels in the one or more subchannels.

18. The method of aspect 17, wherein the receiving the BSR further comprises:

receiving, from the first UE, the BSR comprising:

a first block indicating a first LCG ID associated with the second UE, the common number of subchannels, and a first subchannel of the one or more subchannels; and a second block indicating a second LCG ID associated with the second UE and a second subchannel of the one or more subchannels, the second subchannel being different from the first subchannel.

19. The method of aspect 13, wherein:

the receiving the BSR comprises:

receiving, from the first UE, the BSR further indicating at least one of a destination index, a logical channel group (LCG) identifier (ID), or a buffer size associated with the second UE, and the subchannel information indicates at least one of a rank indicator (RI), a channel quality indicator (CQI), or a subchannel associated with the second UE.

20. The method of any of aspects 13-19, wherein the receiving the BSR comprises:

receiving, from the first UE, the BSR comprising:

a first block comprising a destination index, a logical channel group identifier (LCG ID), a buffer size, and first subchannel information associated with the second UE; and a second block comprising the destination index, the LCG ID, the buffer size, and second subchannel information associated with the second UE, the second subchannel information being different from the first subchannel information.

21. The method of any of aspects 13-19, wherein the receiving the BSR including the subchannel information further comprises:

receiving, from the first UE, the BSR comprising:

a first block comprising a destination index, a first logical channel group identifier (LCG ID), a first buffer size, and first subchannel information associated with the second UE; and a second block comprising the destination index, a second LCG ID different from the first LCG ID, a second buffer size, and second subchannel information associated with the second UE.

22. The method of any of aspects 13-19, wherein the receiving the BSR comprises:

receiving, from the first UE, a medium access control-control element (MAC-CE) comprising:

a first block comprising a first destination index, a first logical channel group identifier (LCG ID), a first buffer size, and first subchannel information associated with the second UE; and a second block comprising a second destination index, a second LCG ID, a second buffer size, and second subchannel information associated with a third UE of the one or more UEs.

23. The method of any of aspects 13-22, wherein the receiving the BSR comprises:

receiving, from the first UE, a medium access control-control element (MAC-CE) comprising:

a first block comprising a destination index, a logical channel group identifier (LCG ID), and a buffer size associated with the second UE; and a second block comprising first subchannel information associated with the second UE and at least one of the destination index or the LCG ID.

24. The method of any of aspects 13-22, wherein the receiving the BSR comprises:

receiving, to the BS, a bundled medium access control-control element (MAC-CE) comprising:

a first MAC-CE comprising a destination index, a logical channel group identifier (LCG ID), and a buffer size associated with the second UE; and a second MAC-CE comprising first subchannel information associated with the second UE and at least one of the destination index or the LCG ID.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
    transmitting, to a base station (BS), a buffer status report (BSR) indicating subchannel information associated with one or more UEs, wherein the BSR comprises:
        a first block indicating a first logical channel group (LCG) identifier (ID) associated with a second UE of the one or more UEs, a number of subchannels, and a first subchannel; and
        a second block indicating a second LCG ID associated with the second UE and a second subchannel, the second subchannel being different from the first subchannel;
    receiving, from the BS in response to the BSR, a grant for transmitting a first sidelink transmission to the second UE; and
    transmitting, to the second UE based on the grant, the first sidelink transmission.

2. The method of claim 1, wherein:
    the transmitting the BSR comprises:
    transmitting, to the BS, the BSR further indicating at least one of a destination index or a buffer size associated with the second UE.

3. The method of claim 2, wherein the subchannel information indicates one or more subchannels, including the first subchannel and the second subchannel, in an order of preference.

4. The method of claim 2, wherein the subchannel information comprises a codeword indicating a starting subchannel of one or more subchannels, wherein the one or more subchannels include the first subchannel and the second subchannel.

5. The method of claim 2, wherein the subchannel information indicates the number of subchannels by indicating a common number of subchannels in the one or more subchannels.

6. The method of claim 1, wherein:
    the transmitting the BSR comprises:
        transmitting, to the BS, the BSR further indicating at least one of a destination index or a buffer size associated with the second UE, and
    the subchannel information indicates at least one of a rank indicator (RI), a channel quality indicator (CQI), or a subchannel associated with the second UE.

7. The method of claim 1, wherein
    the first block further comprises a destination index, a buffer size, and first subchannel information associated with the second UE; and
    the second block further comprises the destination index the buffer size, and second subchannel information associated with the second UE, the second subchannel information being different from the first subchannel information.

8. The method of claim 1, wherein :
    the first block further comprises a destination index, a first buffer size, and first subchannel information associated with the second UE; and
    the second block further comprises the destination index, a second buffer size, and second subchannel information associated with the second UE.

9. The method of claim 1, wherein the transmitting the BSR comprises:
    transmitting, to the BS, a medium access control-control element (MAC-CE) comprising:
        the first block further comprising a first destination index, a first buffer size, and first subchannel information associated with the second UE; and
        the second block further comprising a second destination index, a second buffer size, and second subchannel information associated with a third UE of the one or more UEs.

10. The method of claim 1, wherein the transmitting the BSR comprises:
    transmitting, to the BS, a medium access control-control element (MAC-CE) comprising:
        the first block further comprising a destination index and a buffer size associated with the second UE; and the second block further comprising first subchannel information associated with the second UE and at least one of the destination index or the second LCG ID.

11. The method of claim 1, wherein the transmitting the BSR comprises:
transmitting, to the BS, a bundled medium access control-control element (MAC-CE) comprising:
a first MAC-CE comprising a destination index and a buffer size associated with the second UE; and
a second MAC-CE comprising first subchannel information associated with the second UE and at least one of the destination index or the second LCG ID.

12. A method of wireless communication performed by a base station (BS), the method comprising:
receiving, from a first user equipment (UE), a buffer status report (BSR) indicating subchannel information associated with one or more UEs, wherein the BSR comprises:
a first block indicating a first logical channel group (LCG) identifier (ID) associated with a second UE of the one or more UEs, a number of subchannels, and a first subchannel; and
a second block indicating a second LCG ID associated with the second UE and a second subchannel, the second subchannel being different from the first subchannel; and
transmitting, to the first UE in response to the BSR, a grant for transmitting a first sidelink transmission to the second UE.

13. The method of claim 12, wherein:
the receiving the BSR comprises:
receiving, from the first UE, the BSR further indicating at least one of a destination index or a buffer size associated with the second UE.

14. The method of claim 13, wherein the subchannel information indicates one or more subchannels, including the first subchannel and the second subchannel, in an order of preference.

15. The method of claim 13, wherein the subchannel information comprises a codeword indicating a starting subchannel of one or more subchannels, wherein the one or more subchannels include the first subchannel and the second subchannel.

16. The method of claim 13, wherein the subchannel information indicates the number of subchannels by indicating a common number of subchannels in the one or more subchannels.

17. The method of claim 12, wherein:
the receiving the BSR comprises:
receiving, from the first UE, the BSR further indicating at least one of a destination index or a buffer size associated with the second UE, and
the subchannel information indicates at least one of a rank indicator (RI), a channel quality indicator (CQI), or a subchannel associated with the second UE.

18. The method of claim 12, wherein
the first block further comprises a destination index, a buffer size, and first subchannel information associated with the second UE; and
the second block further comprises the destination index the buffer size, and second subchannel information associated with the second UE, the second subchannel information being different from the first subchannel information.

19. The method of claim 12, wherein
the first block further comprises a destination index, a first buffer size, and first subchannel information associated with the second UE; and
the second block further comprises the destination index, a second buffer size, and second subchannel information associated with the second UE.

20. The method of claim 12, wherein the receiving the BSR comprises:
receiving, from the first UE, a medium access control-control element (MAC-CE) comprising:
the first block further comprising a first destination index, a first buffer size, and first subchannel information associated with the second UE; and
the second block further comprising a second destination index, a second buffer size, and second subchannel information associated with a third UE of the one or more UEs.

21. The method of claim 12, wherein the receiving the BSR comprises:
receiving, from the first UE, a medium access control-control element (MAC-CE) comprising:
the first block further comprising a destination index and a buffer size associated with the second UE; and
the second block further comprising first subchannel information associated with the second UE and at least one of the destination index or the second LCG ID.

22. The method of claim 12, wherein the receiving the BSR comprises:
receiving, from the first UE, a bundled medium access control-control element (MAC-CE) comprising:
a first MAC-CE comprising a destination index and a buffer size associated with the second UE; and
a second MAC-CE comprising first subchannel information associated with the second UE and at least one of the destination index or the second LCG ID.

23. A first user equipment (UE) comprising:
a processor; and
a transceiver coupled to the processor, wherein the transceiver is configured to:
transmit, to a base station (BS), a buffer status report (BSR) indicating subchannel information associated with one or more UEs, wherein the BSR comprises:
a first block indicating a first logical channel group (LCG) identifier (ID) associated with a second UE of the one or more UEs, a number of subchannels, and a first subchannel; and
a second block indicating a second LCG ID associated with the second UE and a second subchannel, the second subchannel being different from the first subchannel;
receive, from the BS in response to the BSR, a grant for transmitting a first sidelink transmission to the second UE; and
transmit, to the second UE based on the grant, the first sidelink transmission.

24. The first UE of claim 23, wherein:
the transceiver configured to transmit the BSR is configured to:
transmit, to the BS, the BSR further indicating at least one of a destination index or a buffer size associated with the second UE.

25. The first UE of claim 23, wherein:
the transceiver configured to transmit the BSR is configured to:

transmit, to the BS, the BSR further indicating at least one of a destination index or a buffer size associated with the second UE, and the subchannel information indicates at least one of a rank indicator (RI), a channel quality indicator (CQI), or a subchannel associated with the second UE.

26. A base station (BS) comprising:

a processor; and a transceiver coupled to the processor, wherein the transceiver is configured to:
- receive, from a first user equipment (UE), a buffer status report (BSR) indicating subchannel information associated with one or more UEs, wherein the BSR comprises:
  - a first block indicating a first logical channel group (LCG) identifier (ID) associated with a second UE of the one or more UEs, a number of subchannels, and a first subchannel; and
  - a second block indicating a second LCG ID associated with the second UE and a second subchannel, the second subchannel being different from the first subchannel; and
- transmit, to the first UE in response to the BSR, a grant for transmitting a first sidelink transmission to the second UE.

27. The BS of claim 26, wherein:

the transceiver configured to receive the BSR is configured to:

receive, from the first UE, the BSR further indicating at least one of a destination index or a buffer size associated with the second UE.

28. The BS of claim 26, wherein:

the transceiver configured to receive the BSR is configured to:

receive, from the first UE, the BSR further indicating at least one of a destination index or a buffer size associated with the second UE, and the subchannel information indicates at least one of a rank indicator (RI), a channel quality indicator (CQI), or a subchannel associated with the second UE.

* * * * *